(12) United States Patent
Gershenfeld et al.

(10) Patent No.: US 7,848,838 B2
(45) Date of Patent: Dec. 7, 2010

(54) DIGITAL ASSEMBLER FOR DIGITAL MATERIALS

(75) Inventors: Neil Gershenfeld, Somerville, MA (US); Patrik Kunzler, Birmensdorf (CH); George Alex Popescu, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 18 days.

(21) Appl. No.: 11/768,176

(22) Filed: Jun. 25, 2007

(65) Prior Publication Data

US 2008/0109103 A1 May 8, 2008

Related U.S. Application Data

(60) Provisional application No. 60/816,032, filed on Jun. 23, 2006.

(51) Int. Cl.
*G06F 19/00* (2006.01)
*D04H 1/16* (2006.01)
*B29C 33/40* (2006.01)

(52) U.S. Cl. .......................... 700/118; 264/113; 264/219
(58) Field of Classification Search .................. 700/118, 700/119, 120
See application file for complete search history.

(56) References Cited

U.S. PATENT DOCUMENTS

| | | | |
|---|---|---|---|
| 5,003,692 A * | 4/1991 | Izumi et al. .................... 29/834 |
| 5,256,340 A | 10/1993 | Allison et al. | |
| 5,568,361 A * | 10/1996 | Ward et al. ................... 361/735 |
| 6,194,859 B1 | 2/2001 | Everman et al. | |
| 6,401,002 B1 * | 6/2002 | Jang et al. .................... 700/119 |
| 6,405,095 B1 * | 6/2002 | Jang et al. .................... 700/118 |
| 6,623,687 B1 | 9/2003 | Gervasi et al. | |
| 6,717,824 B2 * | 4/2004 | Miyajima et al. ............ 361/803 |
| 6,907,307 B2 * | 6/2005 | Chen et al. ................... 700/119 |
| 6,996,440 B2 * | 2/2006 | Maenishi et al. .............. 700/28 |
| 7,467,025 B2 * | 12/2008 | Silverbrook ................. 700/118 |
| 2002/0062909 A1 | 5/2002 | Jang et al. | |
| 2004/0005182 A1 | 1/2004 | Gaylo et al. | |
| 2004/0145618 A1 * | 7/2004 | Silverbrook .................. 347/17 |
| 2005/0015171 A1 * | 1/2005 | Cruz-Uribe et al. ......... 700/118 |

(Continued)

OTHER PUBLICATIONS

Popescu et al., Digital Printing of Digital Materials, MIT Center for Bits and Atoms.*

(Continued)

*Primary Examiner*—Albert DeCady
*Assistant Examiner*—Darrin Dunn
(74) *Attorney, Agent, or Firm*—Norma E. Henderson

(57) ABSTRACT

A digital assembler for creating three-dimensional objects from digital materials made out of discrete components comprises an assembly head, error correction mechanism, parts feeder, and a controller. The assembly head comprises several blades, each with a different function, that move in a linear direction as a unit, assembling the object line-by-line. One blade adds digital materials, another performs error recognition, another performs error removal, and another fills in new digital material where previously removed. In a method for building a structure out of digital materials, a new line is fed to the assembly head and added to the structure. Simultaneously, the new line is pressed down, the last line is checked for errors, the line before last is removed if errors were found during the last cycle, and the line second before last is replaced if it was removed during the previous cycle.

20 Claims, 25 Drawing Sheets

U.S. PATENT DOCUMENTS

| | | | |
|---|---|---|---|
| 2005/0104241 | A1 | 5/2005 | Kritchman et al. |
| 2005/0202660 | A1 | 9/2005 | Cohen et al. |
| 2006/0108320 | A1 | 5/2006 | Lazovsky et al. |
| 2007/0124012 | A1* | 5/2007 | Farnworth et al. ........... 700/118 |
| 2008/0105557 | A1* | 5/2008 | Cohen et al. ................ 205/157 |
| 2008/0145639 | A1* | 6/2008 | Sun et al. ................ 428/304.4 |
| 2009/0043413 | A1* | 2/2009 | Yano et al. .................... 700/95 |

OTHER PUBLICATIONS

Chung et al., Digital Assembly, http://fab.cba.mit.edu/classes/MIT/961.09/projects/digital_assembly, May 18, 2009.*

Popescu, Printer Design, http://fab.cba.mit.edu/classes/MIT/960.07/people/Popescu_George/draft1.htm, Nov. 3, 2006.*

Popescu et al., Digital Materials, The Center for Bits and Atoms, Apr. 13, 2009.*

PCT/US2007/072053, International Search Report and Written Opinion, mailed Jul. 25, 2008.

Griffith, S., "Growing Machines", Ph.D. Thesis, Sep. 2004, Massachusetts Institute of Technology.

Benguigui, L., Experimental Study of the Elastic Properties of a Percolating System, Physical Review Letters, Nov. 19, 1984, pp. 2028-2030, vol. 53, No. 21, Publisher: The American Physical Society.

Kaner, Richard B. et al., Designing superhard material, Science, May 27, 2005, pp. 1268-1269, vol. 308, Publisher: American Association for the Advancement of Science, Published in: Washington, DC, USA.

Shelby, R.A., et al., Experimental verification of a negative idex of refraction, Science, Apr. 6, 2001, pp. 77-79, vol. 292, Publisher: American Association for the Advancement of Science, Published in: Washington, DC, USA.

* cited by examiner

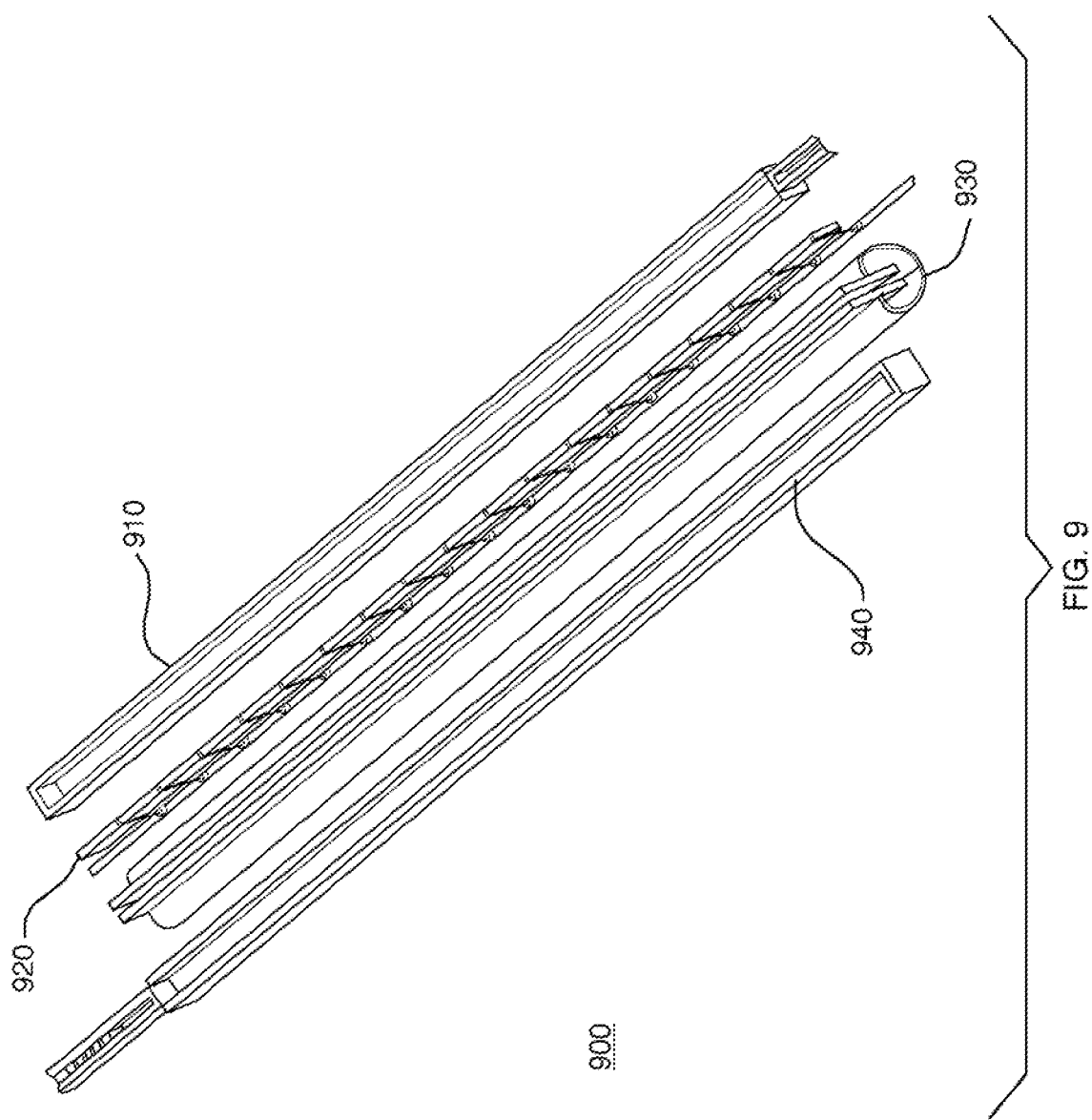

DIGITAL ASSEMBLER FOR DIGITAL MATERIALS

RELATED APPLICATIONS

This application claims the benefit of U.S. Provisional Application Ser. No. 60/816,032, filed Jun. 23, 2006, the entire disclosure of which is herein incorporated by reference.

STATEMENT REGARDING FEDERALLY SPONSORED RESEARCH OR DEVELOPMENT

This invention was made with U.S. government support under Grant Number NSF CCR-0122419, awarded by the National Science Foundation. The government, has certain rights in this invention.

FIELD OF THE TECHNOLOGY

The present invention relates to digital printers and, in particular, to a digital assembler for creating three-dimensional objects from digital materials.

BACKGROUND

Conventional three-dimensional printing processes are generally material-dependent and irreversible. Typically, conventional three-dimensional digital printers use continuous materials, with the digital specification being imposed by external logic. Conventional 3-dimensional fabrication is either additive or subtractive. Additive three-dimensional printers, such as those offered by Stratsys or Zcorp, work by depositing and/or bonding amorphous materials together in a way that results in a three-dimensional structure. Subtractive three-dimensional fabrication, such as with lathes or CNC milling machines, works by removing material from a block of bulk material. These techniques use complex control systems in order to precisely position the working tool in order to accurately build the desired object. The substrates, typically powders and binders for additive processes, or blocks of raw material for subtractive processes, define the material and surface properties of the final product, but not its shape.

Existing Freeform Fabrication is mainly Analog Additive 3D Printing, as most existing assemblers build structures by dispensing small amounts of one or two different materials as droplets of very precise size and in very precise location. Most existing commercial free-form fabrication printers build by putting together small quantities of no more than a few expensive materials. In order to make high-resolution objects, they need to be very precise, and therefore they cost between tens and hundreds of thousands of dollars and must be operated by skilled technicians.

Existing technology in this field typically employs one of several processes. In one method, a component is constructed by depositing a first layer of a fluent porous material or porous solid. Next, a binder material is deposited to selected regions to produce a layer of material. A second method consists of incorporating a movable dispensing head provided with a supply of material which solidifies at a predetermined temperature or when exposed to light or UV light. Instead of dispensing drops, other apparatuses place a filament at the desired position then heat it to convert a portion of the filament to a flowable fluid that is solidified in that position. A third approach comprises fabricating a three-dimensional object from individual layers of fabrication material having a predetermined configuration. Successive layers are stacked in a predetermined sequence and fixed together to form the object. Refinements include producing parts from two distinct classes of materials, where the first class of material forms a three-dimensional shape defined by the interface of the first class of material and the second class of material.

Solid Freeform Fabrication (SFF) technologies depend on the use of computers to generate cross-sectional patterns representing the layers of the object being formed, and generally require the associated use of a computer and computer-aided design and manufacture (CAD/CAM) software. In general, these techniques rely on the provision of a digital representation of the object to be formed. The digital representation of the object is reduced or "sliced" to a series of cross-sectional layers that can be overlaid to form the object as a whole. The stereolithography apparatus (SLA) or other apparatus for carrying out the fabrication of the object then utilizes the cross-sectional representations of the object for building the object on a layer-by-layer basis by, for example, determining the path of the laser beam in an SLA or the configuration of the mask to be used to selectively expose UV light to photosensitive liquids.

For example, in U.S. Pat. No. 6,623,687 (Gervasi et al.), Solid Freeform Fabrication or rapid prototyping techniques are used for quickly making complex or simple three-dimensional objects. In general, SFF processes enable rapid and accurate fabrication of three-dimensional objects which otherwise could be produced only by lengthy molding and machining processes. SFF techniques are, generally speaking, additive processes whereby the object to be formed is fabricated by reducing a model or representation of the object's ultimate configuration into a series of planar cross-sections and subsequently recompiling the cross-sections to reconstruct the object.

Stereolithography is one of several known SFF techniques. In this process, using an SLA, an ultraviolet laser beam selectively scans a reservoir of a photosensitive liquid along a predetermined path. Upon the laser beam being exposed to the portions of the liquid lying in the beam's path, the exposed portions of the liquid cure or solidify through polymerization. Examples of stereolithographic methods and equipment are disclosed in U.S. Pat. No. 5,256,340 (Allison).

Another known SFF process utilizes Cubital's Solider system. This process utilizes a photo-mask that represents the image of the particular layer of the object to be produced. The mask is positioned over a layer of photosensitive liquid. Selective solidification of the layer occurs upon exposure of ultraviolet light through the mask. Unsolidified resin is drained from the partially composed object leaving the desired configuration of surfaces and cavities. The cavities of the object are then filled with a liquid material having a relatively low melting point, such as wax. Upon solidification of the wax, the uppermost layer of the object is made uniform, such as by planning or milling. Then a new layer of the photocurable liquid is positioned on the surface. Another mask is created and the process is repeated. Upon completion of production, the wax is melted and poured from the object to expose the configuration of the object. The object may comprise a plurality of interconnected, internal cavities or may be hollow.

Another known SFF techniques is plasma deposition, whereby plasma is deposited along a predetermined path and permitted to solidify to build an object on a layer by layer basis. One such additive technique is known as Laser Engineered Net Shaping (LENS) technology developed by Optomec, Inc., located in Albuquerque, N. Mex. The Optomec Directed Materials Deposition process uses a high power laser focused onto a substrate to melt the substrate surface. Metal powder is then blown into the melt pool to increase its volume. Subsequent scanning of the substrate relative to the laser beam provides a means to deposit thin metal lines on the substrate surface. With the addition of computer control, the Optomec system deposits the metal lines to form patterns on the substrate surface. Finally, this patterning method is coupled with the ability to interpret 3D CAD designs and allows those patterns to represent a series of slices through the part from the CAD system. Using this method, a component can be fabricated directly from a CAD solid model one layer at a time until the entire object is realized. The result is fully dense metal parts with dimensional accuracy.

Another way of making complex 3D objects is folding, as is seen, for example, in proteins, RNA, DNA, and other naturally occurring molecules. The principle of this technique is that the sequence of the elements assembled determines how they will fold into the final, 3D object. The folding process does not require machines, but the parts required are very complex. Similarly, assembly of 2D or 3D objects using pick-and place mechanisms uses the precise location of the tool, as well as the shape properties of the components to determine the shape of the object to be built, thus still requiring complex control systems.

Other types of three-dimensional fabrication technologies involve structures built out of many discrete parts, in order to enable Avogadro-scale engineering and nano-fabrication of complex systems. These techniques include algorithmic assembly, programmed assembly, self-assembly, programmable self-assembly, and error correction self assembly. Digital materials are related to these technologies, as many fabrication techniques, including these, can build and use digital materials. Digital materials can be seen as a higher level of abstraction, as they are composed of elementary discrete parts which themselves are made of some material. Digital materials are fully described by the nature of the part they are made out of and the nature of the connections they can form.

SUMMARY

In one aspect, the present invention is a digital assembler for creating three-dimensional objects from digital materials. The assembler of the present invention is a synchronized state machine, with subunits that are responsible for different functions. In a preferred embodiment, the digital assembler subunits are assembler head, error correction mechanism, parts feeder, machine frame, and controller. In one embodiment, the assembly head comprises four "blades", each with a different function, that move in a linear direction as a unit, assembling the structure line by line. One blade adds digital materials, another performs error recognition, a third performs error removal, and a fourth blade fills in new digital material where previously removed due to errors.

In another aspect, the present invention is a method for building a structure out of digital materials. In a preferred embodiment, a new line is fed to the assembly head and added to the structure. Simultaneously, the new line is pressed down, the last line is checked for errors, the line before last is removed if errors were found during the last cycle, and the line second before last is replaced if it was removed during the previous cycle. If more lines are to be placed in this layer, the process continues with a new line being fed to the assembly head. Otherwise, the layer is completed. If there are more layers to go, rotation takes place, and the next line is fed to the head.

A digital assembler according to the present invention employs digital material made out of discrete components. The components can be of any size and shape, made out of various materials, and can fit together in various ways. The components of digital materials must satisfy the conditions that each component can be decomposed into a finite number of smaller geometrical shapes, that two components can only make a small finite number of different connections (links), and that the connection between any two components is reversible. An example of a suitable digital material is GIK.

The present invention is based on three-dimensional assembly of mass-produced two-dimensional components of digital material. This significantly enlarges the available material set, allows reversible disassembly, and imposes constraints that reduce the accumulation of local positioning errors in constructing a global shape. Experimental work on material properties and dimensional scaling of the digital material will be presented, with application in assembling functional structures. Digital materials bring reversibility, simplicity, low cost and speed to free form fabrication in addition to a larger material set. Assembling digital material will be the future of 3-dimensional free-form fabrication of functional materials.

BRIEF DESCRIPTION OF THE DRAWINGS

Other aspects, advantages and novel features of the invention will become more apparent from the following detailed description of the invention when considered in conjunction with the accompanying drawings wherein:

FIG. 9 depicts a preferred embodiment of an assembly head, having four blades according to one aspect of the present invention;

DETAILED DESCRIPTION

In one aspect, the present, invention is a printer that builds functional three-dimensional structures by reversible assembly of a discrete set of components ("digital materials"). This approach uses the components rather than a control system to impose spatial and functional constraints, and can be performed as a parallel rather than as a linear process. In the assembly process of the present invention, the shape of the object that is being built is determined solely by the types of digital components and the sequence in which they are assembled. Precise location of the assembler head is not necessary, since the positions of the components to be added are pre-determined by the sequence in which they are added. Therefore the digital assembler control systems of the present invention are far less complex than existing systems. This makes the assembly-process cheaper, faster, and more reliable than known processes. The process of the present invention is also reversible, for error correction or so that the components may be disassembled and re-used. This permits recycling of components, efficient error correction, and modification of a built object at any time during its life.

As used herein, the following terms expressly include, but are not to be limited to:

"Digital material" means a material made out of components wherein the set of all the components used in a digital material is finite (i.e. discrete parts), the set of the all joints the components of a digital material can form is finite (i.e. discrete joints), and the assembly process has complete control over the placement of each component (i.e. explicit placement).

"Digital system" means a system that uses discrete numbers, especially binary numbers, or non-numeric symbols, such as letters or icons, for input, processing, transmission, storage, or display, rather than a continuous spectrum of values. Data-carrying signals in a digital system have one of two values—logic "1" or "0". An example of digital systems is transistor logic, where a "1" is coded by a high voltage, typically 5 volts, and a "0" is coded by a low voltage, typically 0 volts.

Figure 1:
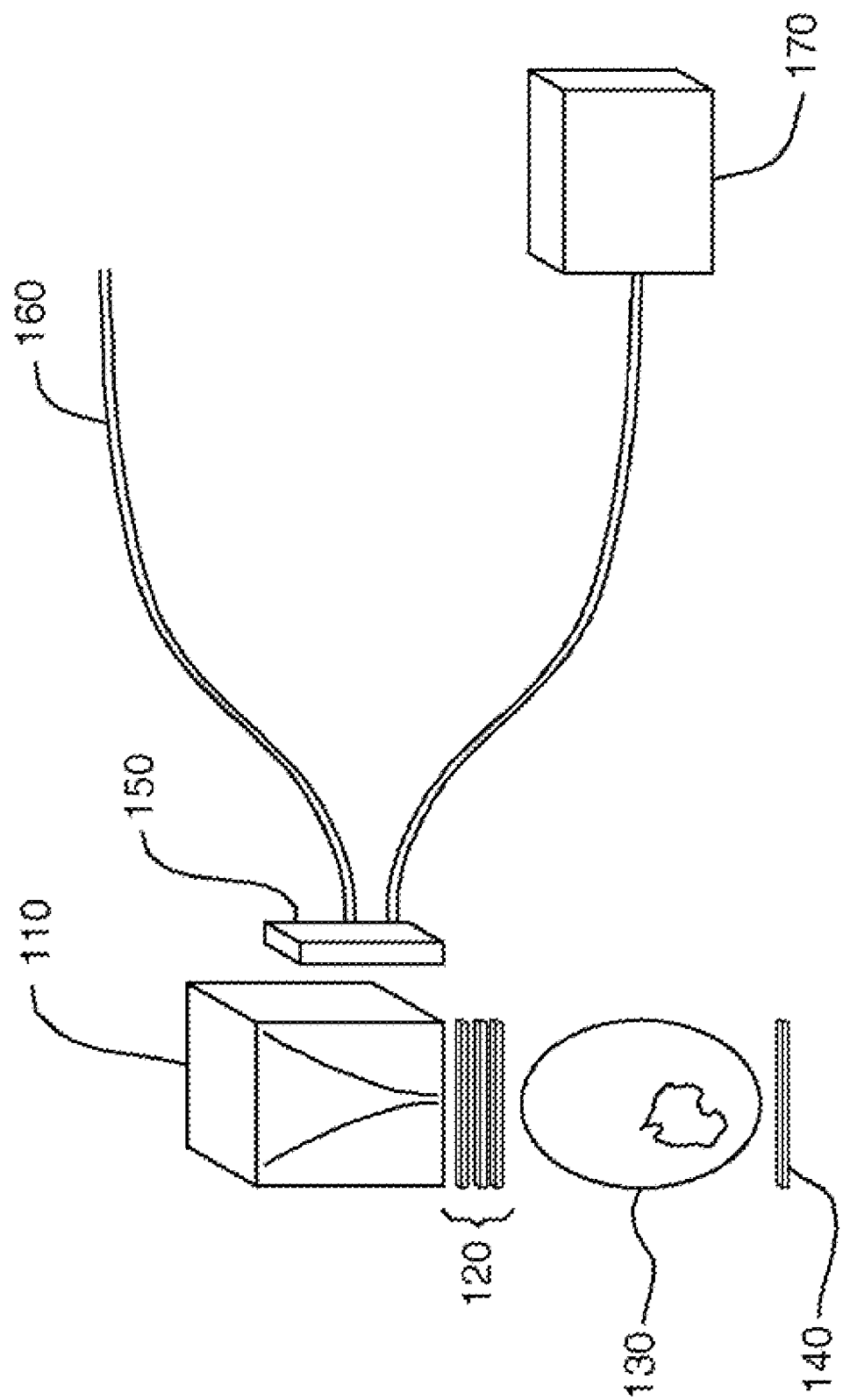
FIG. 1 is a conceptual model of generic assembler according to one aspect of the present invention.

The assembler of the present invention is a synchronized state machine. It has subunits that are responsible for different functions. In a generic embodiment, the digital assembler subunits are assembler head, error correction (preferably integrated into the assembler head), parts feeder, machine frame, and controller (e.g. microprocessor, memory, FLASH memory). FIG. 1 is a conceptual model of generic assembler according to one aspect of the present invention. In FIG. 1, feeder 110 provides digital material line-by-line to assembly head 120, which assembles 3-dimensional object 130 on support plate 140, under the control of control unit 150. Also shown are power supply line 160 and optional PC 170 for programming control unit 150. Feeder 110 provides the digital material to assembly head 120 in an ordered manner, one line at a time. In a preferred embodiment, assembly head 120 comprises four "blades" that move in a linear direction as a unit, assembling the structure line by line. Each blade has a different function. One blade adds digital materials, another performs error recognition, a third performs error removal, and a fourth blade fills in new digital material where the third blade had removed it due to errors. This method reduces the number of errors by an order of magnitude relative to not having error detection at all. Several head units may optionally work in parallel. Control unit 150 controls the actuators and synchronizes the different parts of the machine. The assembler of the present invention is simple to build and design, and has the particular advantage of being modular.

A digital assembler according to the present invention employs digital material made out of discrete components. The digital material can be used to 3D print functional freeform structures. The components can be of any size and shape, made out of various materials, and can fit together in various ways (including, but not limited to, press fit, friction fit, snap fit, and reflow binding). The components of digital materials must satisfy the conditions that each component can be decomposed into a finite number of smaller geometrical shapes, that two components can only make a small finite number of different connections (links), and that the connection between any two components is reversible. For example, because the cement in a cement/brick wall is not discrete, a cement/brick wall is not a digital material. In the same way, an object built in a 3D printer using fused deposition modeling (FDM) is not digital. While all drops are discrete, any two of them can be assembled in an infinite number of different positions and form a continuous set of joints.

Figure 2A:
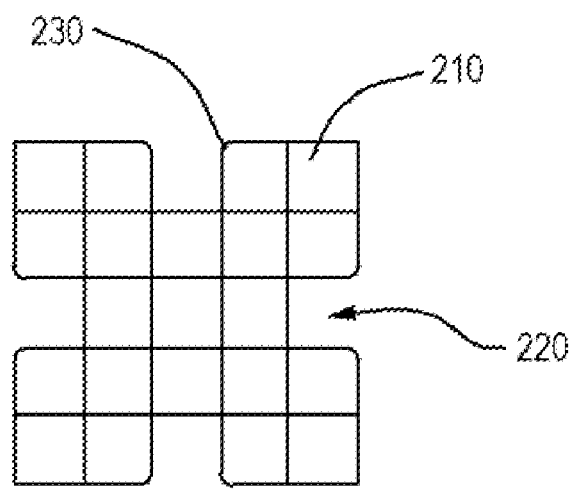
FIG. 2 is exemplary square GIK part according to one aspect of the present invention.
Figure 2B:
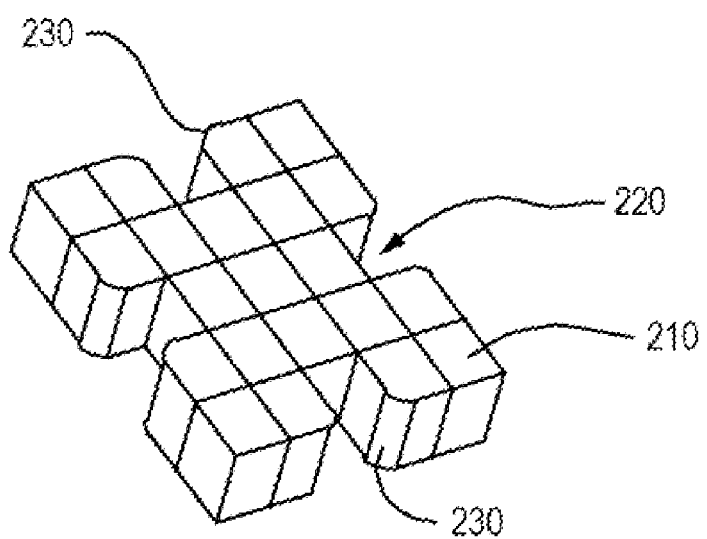

An example of a digital material is GIK ("Great Invention Kit"). GIK is a digital material built by press-fitting together elementary components. GIK bricks can be cut in two dimensions, which makes them very easy to make at any scale. They can be press fit together to form space-filling voxels that can be connected and disconnected at will, making the construction reversible. In addition, they can be made out of a variety of materials. An exemplary square GIK part is shown in FIGS. 2A-B. FIG. 2A is a top view of a square GIK, depicting its construction from 21 sections 210 with four slots 220 and 8 chamfers 230. FIG. 2B, is a 3-dimensional model of the square GIK of FIG. 2A. Many other geometries, such as, but not limited to, rectangles or triangles, are possible.

Below eye resolution GIK parts (1 μm and smaller) have macro-scale behavior, but can form high resolution objects that seem continuous. GIK building blocks are in that way analogous to an atom that assembles to form a crystalline lattice. Similarly, a combination of GIK materials can be assembled within one structure to create components with unique properties. For certain types of assemblies, GIK blanks ("BLANKS") may be needed. BLANKS are placeholders used during the assembly process that do not connect to GIKs but share the overall dimensional characteristics of the GIKs with which they are used. GIKs only make stable connections with other GIKs, not with BLANKS.

Figure 3:
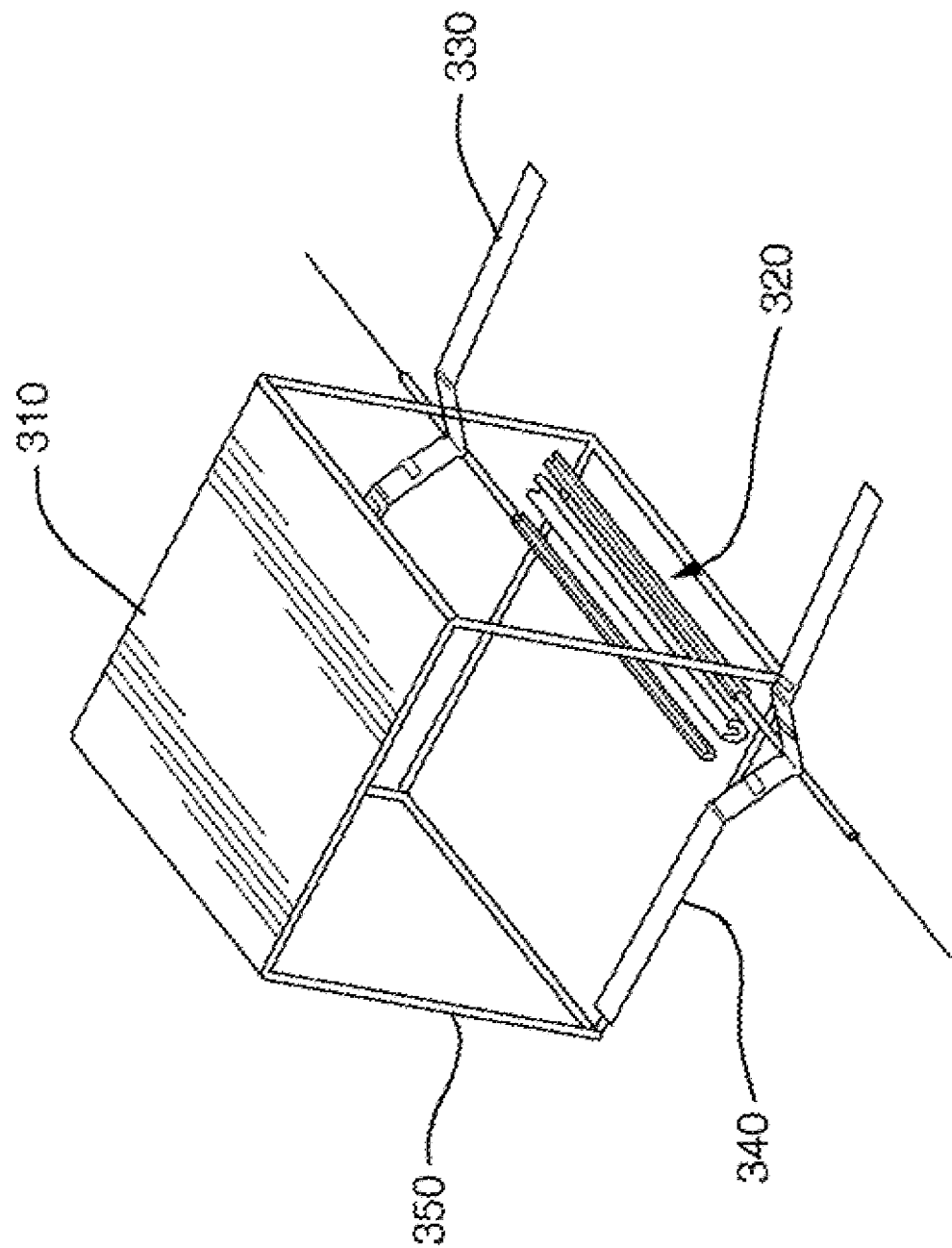
FIG. 3 a schematic overview of a simplified embodiment of a digital assembler according to the present invention.

FIG. 3 is a schematic overview of a simplified embodiment of a digital assembler according to the present invention. In FIG. 3, the digital assembler has support plate 310 that provides support for the first layer of vertical GIK and holds the object to be assembled, one or more assembly heads 320, and two feeders 330, 340 for each head, all of which are held together within frame 350. Frame 350 is a rigid cage that all the machine functions are assembled upon, providing support for all the other modules. The size of the machine frame defines how big an object can be built.

Figure 4:
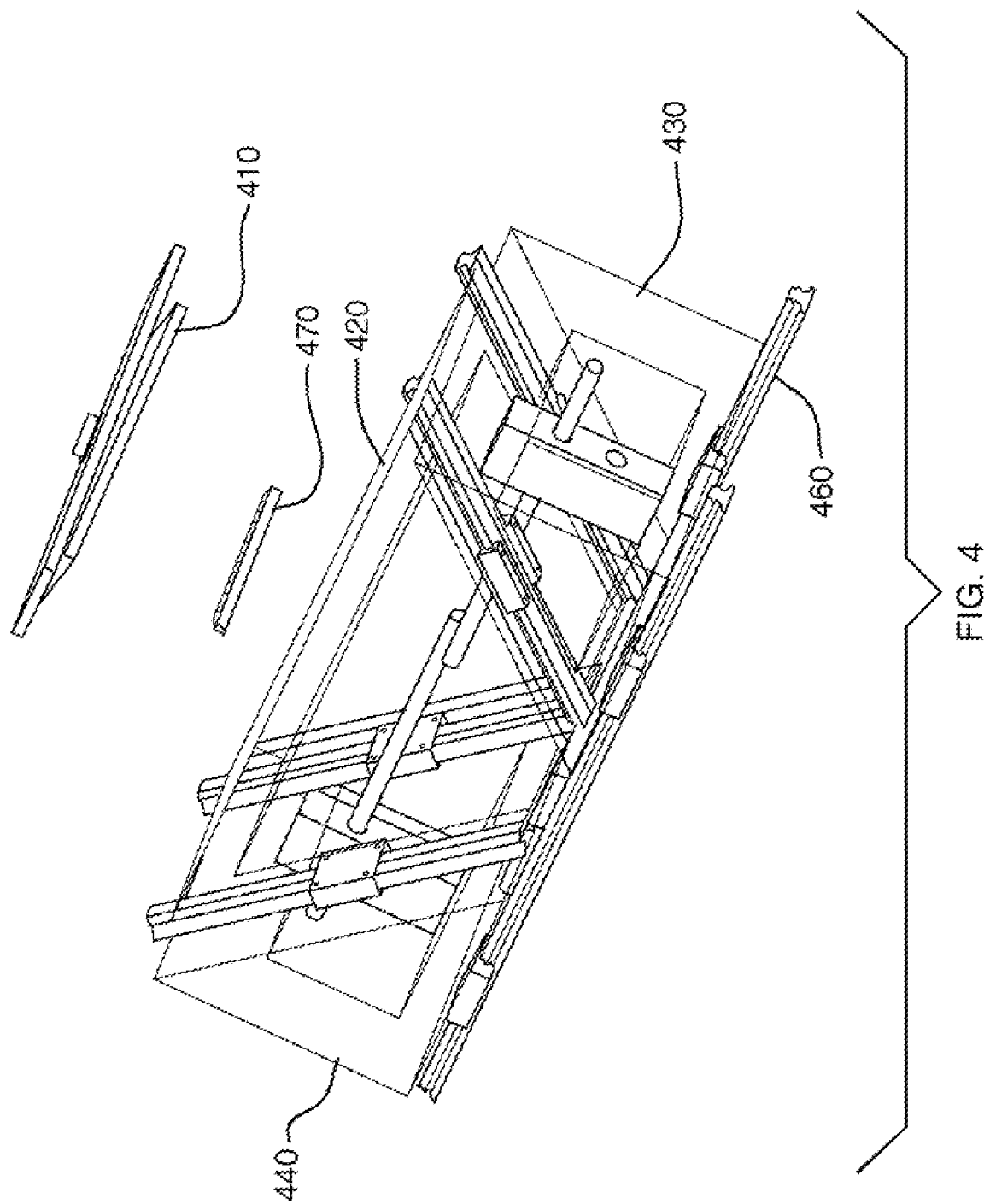
FIG. 4 is an interior view of a preferred embodiment of an assembler according to the present invention.

FIG. 4 is an interior view of a preferred embodiment of an assembler according to the present invention. The digital assembler of FIG. 4 employs a 45 degree mechanism that allows it to use two electrical DC motors to move simultaneously in the x and z directions. As shown in FIG. 4, support plate 410 supports the first layer of vertical GIK and holds the object to be assembled. Support plate 410 is mounted on a shaft supported with 2 thrust bearings. If the motors turn in the same direction, platform 420, the structure that supports the assembler blades, moves up or down. If the motors move in opposite directions, then platform 420 moves left and right due to the left and right movement of platforms 430, 440, which move on rails 460. If both platforms 430, 440 move to the right, then the assembly head moves to the right; if they both move to the left, then the head moves to the left. If platform 440 moves to the right and platform 430 moves to the left, the head moves up. If platform 440 moves to the left and platform 430 to the right, then the head moves down. During operation, assembly head 470 is supported by platform 420.

Figure 5:
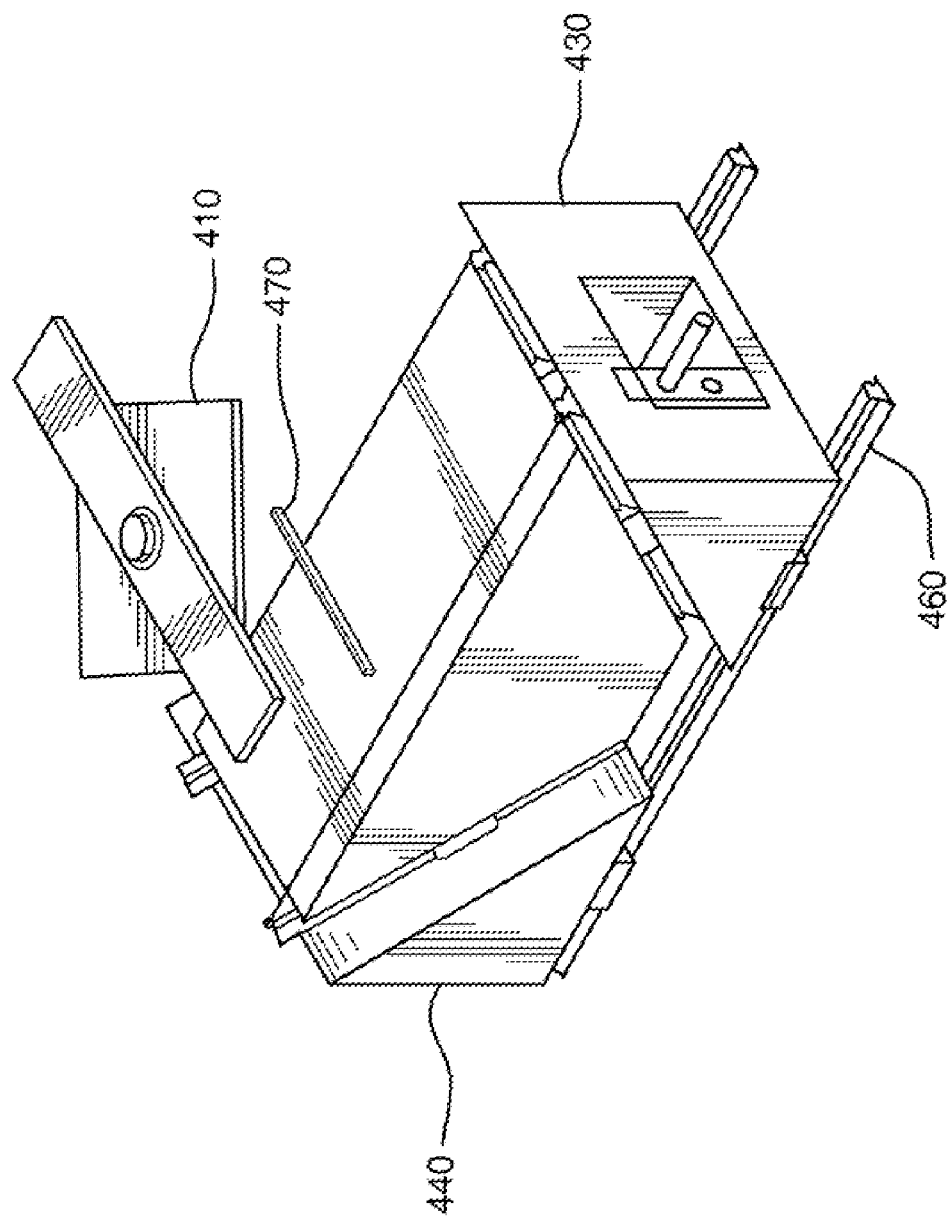
FIG. 5 is an isometric view of the embodiment of FIG. 4.
Figure 6:
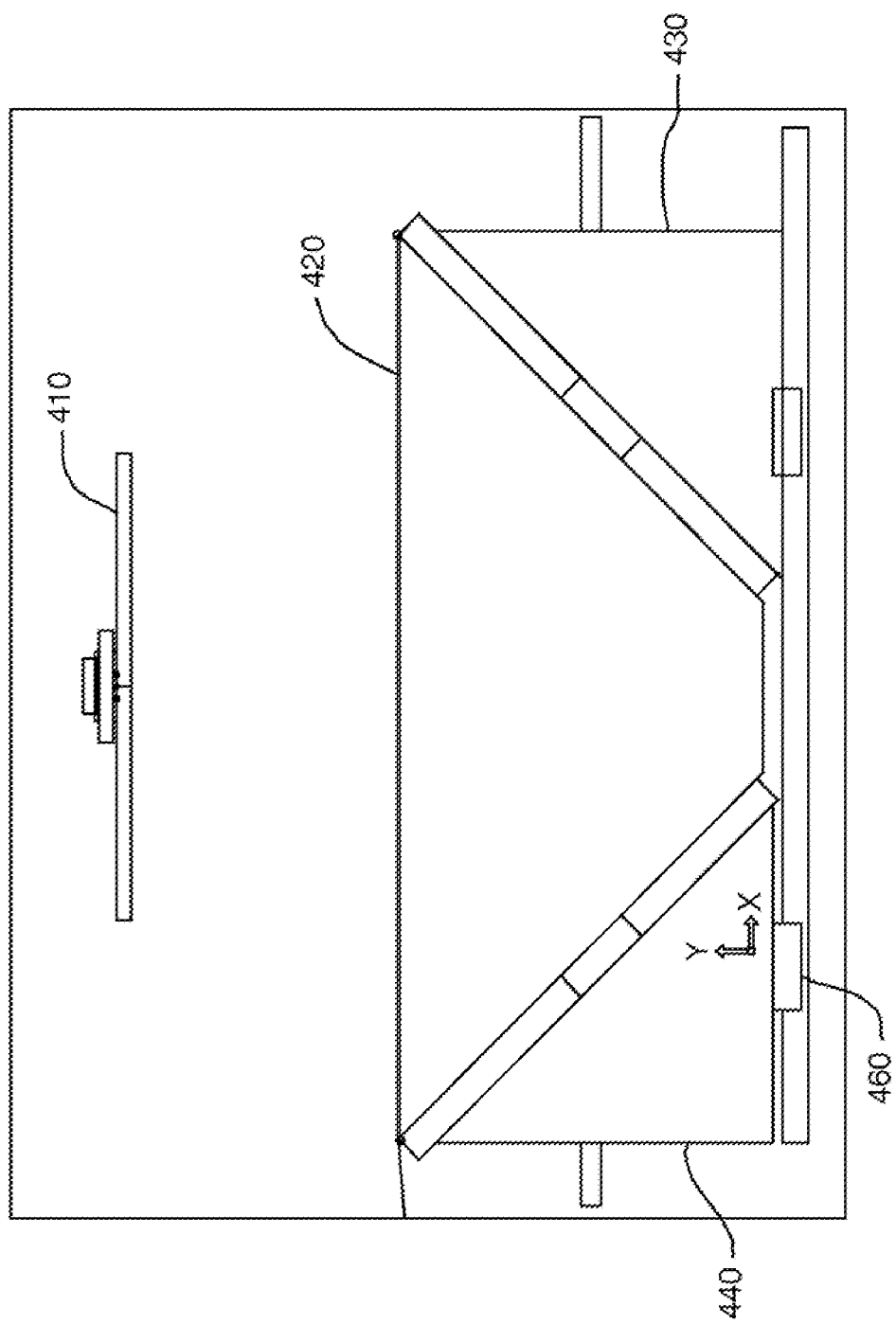
FIG. 6 is a front view of the embodiment of FIG. 4.

FIG. 5 is an isometric view of the embodiment of FIG. 4. In FIG. 5, platform 420 is shown supporting assembler head 470. FIG. 6 is a front view of the embodiment of FIG. 4.

A GIK structure is composed of one or more layers of GIK. Each GIK layer is composed of one or more GIK lines. Each line is comprised of GIK components that create links with other GIK components and BLANKS that do not create links. Each line is comprised of GIK only in the positions where GIK is to be added to the structure, with BLANK parts in the remaining positions. The alternation of GIK and BLANKS therefore defines the structure to be built.

A main principle of the assembler architecture of the present invention is that the assembler always adds lines of constant length, one entire line at a time. The structure to be built is therefore encoded solely in the temporal sequence of parts that the assembler is adding. The assembler is able to add one entire line of GIK parts in one single movement. By using GIK parts, the assembler only needs to assemble parts by moving in one dimension, from the top down, in order to assemble (press in) new components. The assembler then has to shift by at least one GIK slot every time before assembling a new line. In order to make a rigid structure, the assembler has to rotate by 90 degrees every time it is assembling a new plane. It will be clear to one of skill in the art that the assembler's moving parts therefore only have to move up and down in one dimension and be able to do ninety degrees rotations. The digital assembler is therefore dual-axis (one translation, one rotation).

The assembler head movement amplitude has to be large enough to accommodate the size of the entire object being assembled. As material is added line by line, three types of movements are required. Big vertical movements permit moving the assembling head up and down over the object. This is a 1D movement. This movement has to press down, not too hard, but hard enough to put the GIK parts in position. Small movements allow the assembler head to position itself to add the next line in the current build plane. This is a 2-dimensional STEP-by-STEP movement and has to be precise. The size of the STEP is the size of a unit in the GIK part. Due to GIK assembling movement, there also needs to be rotational movement in order to rotate the assembling head by 90 degrees at each extra layer. It is therefore necessary to be able to rotate the assembling head by 90 degrees and back.

The support plate, on the side towards the head, has slots so that GIK parts can attach to it. In operation, the head moves up and down, adding an entire line in a single movement. The feeders supply the head with the parts that are intended to be assembled in one head movement. When the head moves up, it is simultaneously pressing in a new line, checking the last line added for errors, removing the line before the last one if it has been found to have errors, and replacing the line from 3 lines ago if it was removed during the previous movement. Decomposed into elementary actions: parts are fed in the line holder, and a piston pushes the line into the build blade of the assembler head. The assembler head moves up against the existing structure of the support plate. A connection is made between the GIK parts in the head and the support plate/existing structure. The head moves back down, leaving the GIK parts in position. The head and the feeders move one line to the left. Once a layer is finished, the head and the feeders rotate by 90 degrees.

Figure 7:
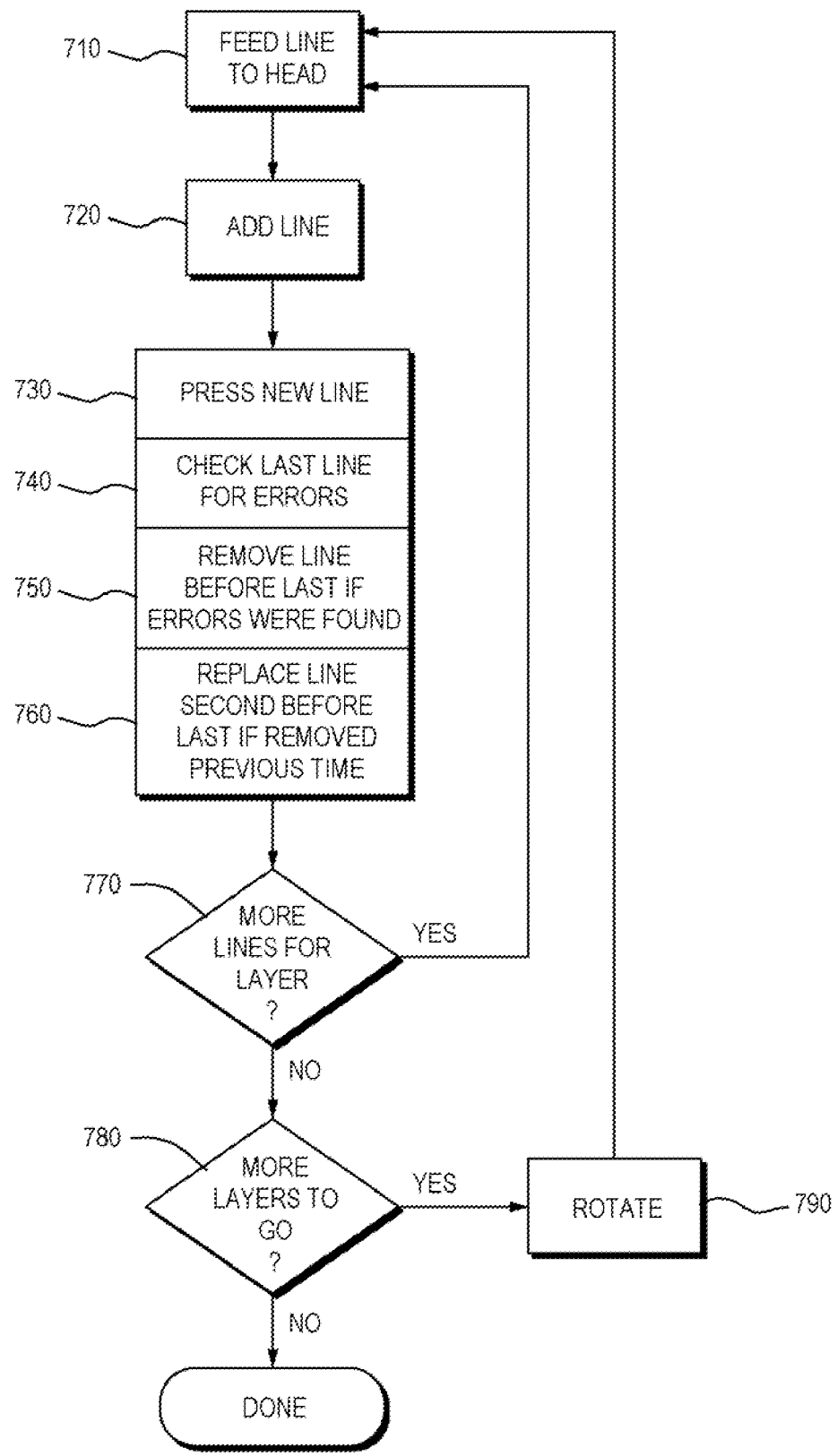
FIG. 7 is a simplified flowchart of the operation of an embodiment of the digital assembler of the present invention.

A simplified flowchart of the operation of an embodiment of the digital assembler of the present invention is depicted in FIG. 7. In FIG. 7, a new line is fed 710 to the head and added 720 to the structure. Simultaneously, the new line is pressed down 730, the last line is checked 740 for errors, the line before last is removed 750 if errors were found during the last cycle, and the line second before last is replaced 760 if it was removed during the previous cycle. If more lines are to be placed in this layer 770, the process continues with a new line being fed 710 to the assembly head. Otherwise, the layer is completed. If there are more layers to go 780, rotation 790 takes place, and the next line is fed 710 to the head.

Figure 8:
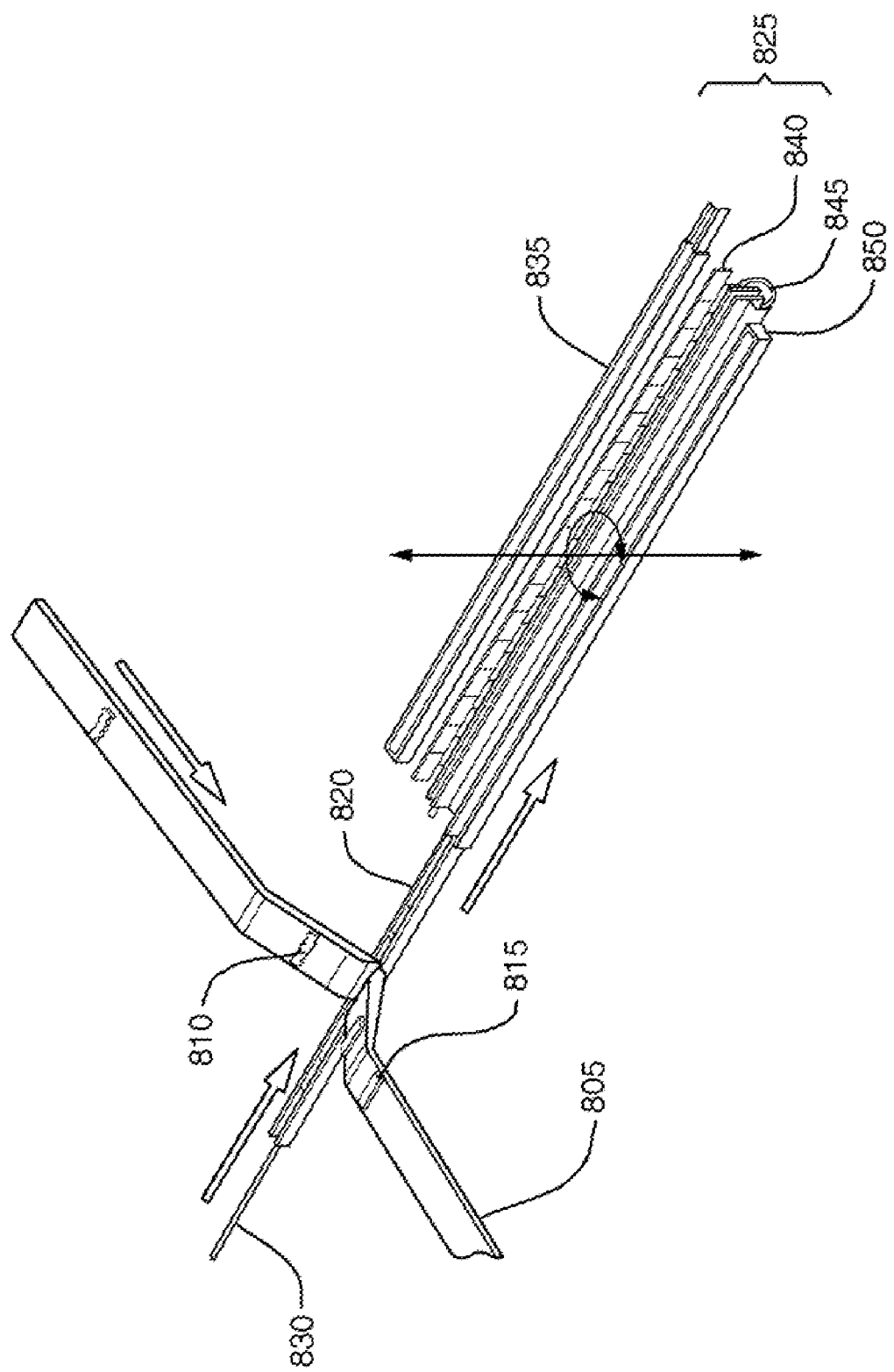
FIG. 8 depicts an embodiment of the assembler head and the feeder, according to one aspect of the present invention.

FIG. 8 depicts the main components of an embodiment of the assembler head and feeder, showing the way they work together. In FIG. 8, feeder 805 feeds GIK parts 810 and BLANK parts 815 into rail "line holder" 820. The arrows indicate the direction in which parts 810, 815 are moving. Head 825 can move up and down, and rotate by 90 degrees. Once all parts 810, 815 are in position, piston 830 pushes the parts inside first build blade 835 of head 825. Head 825 moves up to press the entire line in build blade 835 against the existing structure to add it. Simultaneously, error detection blade 840 checks the previous line for errors, and, if necessary, line removal blade 845 removes the line before if errors were detected and/or second build blade 850 replaces a previously removed line. A second feeder (not shown) feeds second building blade 850.

FIG. 9 depicts a preferred embodiment of an assembly head, having four blades. In FIG. 9, assembler head 900 is comprises four blades: building blade 910, error detection blade 920, error removal blade 930, and line rebuilding blade 940. Building blade 910 builds new lines, while simultaneously error detection blade 920 will check for errors in the last line built by comparing the pressure between two adjacent parts in a row, error removal blade 930 removes errors detected in the line before last, and rebuilding blade 940 rebuilds the removed line from the previous cycle (if any). In construction mode, error removal blade 930 and line rebuilding blade 94 are used only if an error is detected. In disassembly mode, only error removal blade 930 functions.

Figure 10A:
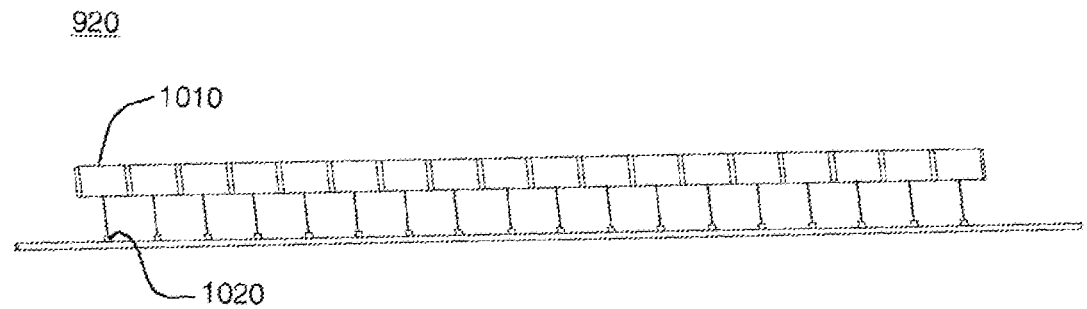
FIGS. 10A-B depict a preferred embodiment of the error detection blade of FIG. 9, according to one aspect of the present invention.
Figure 10B:
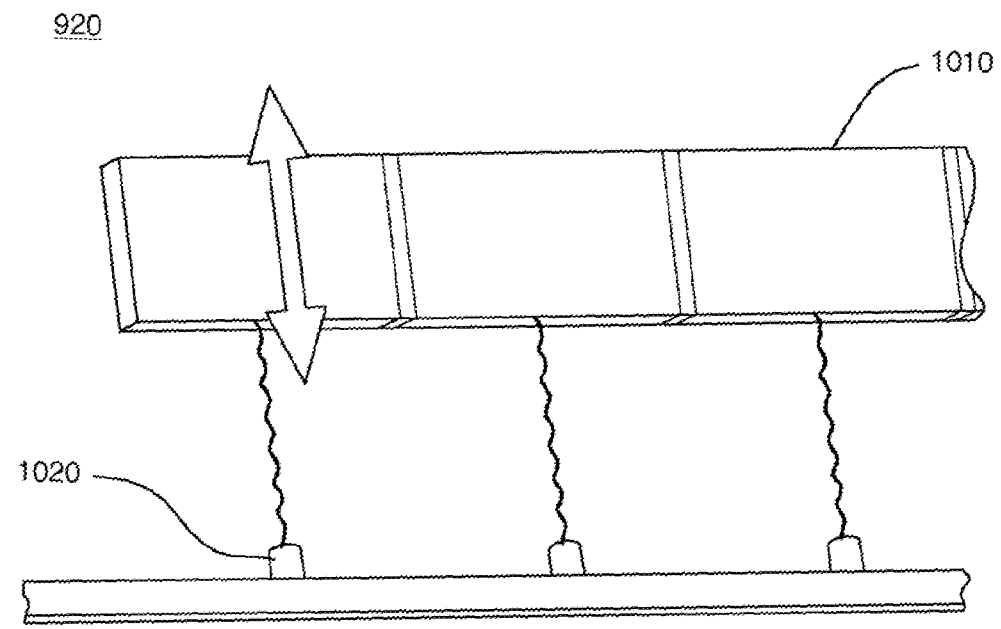

FIGS. 10A-B depict a preferred embodiment of error detection blade 920 of FIG. 9. Blade 920 has the same number of position sensors as there are GIK pieces in a line. Each position sensor has a "touch pad" 1010 and a sensor 1020 that detects how much pressure is applied against "touch pad" 1010. If blade 920 is pushed against a GIK line with errors, it will sense a difference in pressure between two adjacent sensors 1020. An error is detected if there is too high a pressure difference between two adjacent pads 1010. Touch pad 1010 is free to move up and down. The blades 1, 3 and 4 can be seen in FIG. 6. The blades 1 and 4 are building.

In an alternate embodiment, the head has three blades, a building blade (blade 1), a blade for error detection and removal (blade 2), and a blade mat replaces substrate pieces that were removed due to errors (blade 3). The error detection and removal blade checks for errors by comparing the new row to the program, and removes the row if it does not correspond to the desired motif. The error correction blade substitutes the row if the row was removed. The functions of blades 1 and 3 in the three-blade configuration may be swapped in a head designed for printing in the reverse direction.

Figure 11:
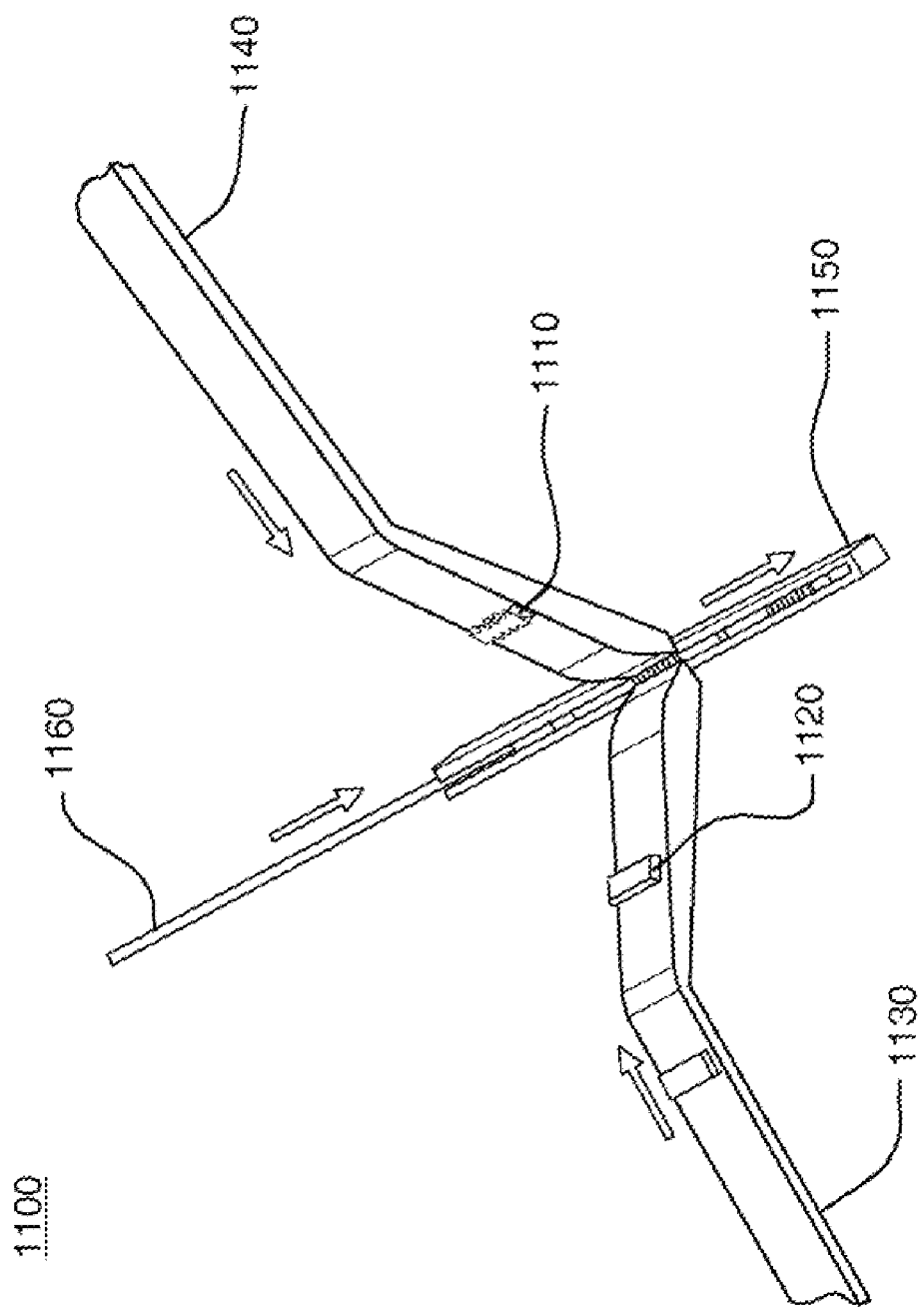
FIG. 11 depicts an exemplary embodiment of a parts feeder according to one aspect of the present invention.

There are many suitable ways in which to implement a parts feeder. In order for the machine to work at high speed, the feeder has to be able to feed one entire line to the head in the same amount of time that it takes the head to add one line. FIG. 11 depicts one possible implementation of the feeder. In FIG. 11, feeder 1100 has a continuous supply of GIK 1110 and Blank 1120 parts arriving on two separate conveyor belts 1130, 1140. Feeder 1100 moves line holder 1150 while it is either actuating the GIK line or the Blank line. This way a legal line made out of GIK 1110 and Blank 1120 parts is formed. Once the line is ready, piston 1160 pushes the entire line into the assembler head while making sure all the parts are in contact. If the parts are packed together appropriately, they will face the slot to which they will connect.

The parts feeder is, in practice, determining which structure the digital assembler is building by determining the sequence of GIKs being fed to the machine head. The assembler head only adds the line it is given. The machine may be programmed using a PC or similar device, with there being communication between the and the assembler. The assembler is able to receive instructions from the PC (the program) and to store the program in memory. There is also preferably a microcontroller that knows in which state the feeder is in, and what is it doing at any given moment, so that it can send instructions for the next step. The line feeder picks up all the blanks it needs for the next line in one step. It does the same with the GIKs. Each part fills up one space on the line feeder. The feeder has a continuous supply of GIK and BLANK parts arriving on the two separate conveyer belts. The GIK parts and BLANK pails arrive in parallel on separate conveyer belts that are actuated as needed to form the line in the line holder. It will be clear to one of skill in the art that if more than two part types are needed, more parallel conveyor belts may be added.

The order in which the feeder supplies the GIK to the assembler determines which structure the assembler is building. Preferably, there is provided a means for communicating the design files for the structure directly to the feeder from a PC. There is a line feeder that is programmed in a mechanical state. The line feeder's mechanical (physical) configuration allows it to dispense all the BLANKs and GIKs in the special or temporal sequence required. Then it puts the line in the assembling head, which only presses down the line. For this reason, the GIK and BLANK parts are preferably sorted into different compartments. In an alternate version, substrate feeding is done in parallel. The assembler has a program that defines the assembler head mechanical state. Due to this mechanical (physical) configuration, the assembler head picks up all the BLANKs that it needs for the next line in one step. It does the same with the GIKs. Now the assembler head is ready to assemble the next line.

In the current, functioning prototype of a digital assembler according to the present invention, the frame is constructed, of aluminum 6061, cut on a commercial water jet cutter. Versa-Mount Guide Blocks and Rails were purchased from McMaster Carr. The machine frame was made with 80/20 the Industrial Erector Set. The support plate was made out of 6061 aluminum 0.5" thick purchased from McMaster Carr and installed on a NEMA 23D Frame Motors. The machine is 2 feet high, 3.5 feet wide, and 1 foot deep. It is able to assemble a 1 cubic foot structure of vertical Delrin-made GIK.

The digital assembler of the present invention may be actuated by any of the methods and devices known to those of ordinary skill in the art. In the current embodiment, the x-z actuation employs two 2 Pittman Express Model 14206S011 brushless DC motors with encoders. The motors move the blades up, down, left, and right. They are coupled with a stiff coupling to 3 feet long/5;8" thick ball screws. Mounted on the ball screws are 2 ball screw nuts. Attached to the bail screw nuts are platforms 430, 440 (FIG. 4). Platforms 430 and 440 are each supported by 2 carriages 460 mounted on 2 3-feet-long circular rails. The platforms are free to move in the x direction only. Mounted on platforms 430, 440 is platform 420, which is attached to platforms 440, 430 with carriages on linear rails. Platform 420 is free to move in z direction only. When the 2 DC motors turn, head 470, mounted on platform 420 moves up, down, left, and right. Platform 410, mounted above the blade on a shaft supported with 2 thrust bearings, is a 12"×12"×½" plate of aluminum with a first layer of vertical GIK parts attached to it with screws. The blade adds parts on this first layer to build the object. The shaft is actuated by a Nema 23 D Frame Motor mounted on the frame of the machine. The Nema motors is able to turn the support plate by plus or minus quarter turns. The stepper motor and the DC brushless motors are controlled by a controller board using the H-bridge chip MC338087 purchased from Digikey. The PC controlling the controller board is connected via the USB port to the controller board. The PC runs a Graphic User Interface developed in Python to control the motors.

While the described embodiment is designed to use vertical GIK, it will be clear to one of ordinary skill in the art that modifications may be easily made that will permit assembly of any other digital material of different shapes and/or different connection mechanisms, including other shapes of GIK. Because the present invention assembles a digital material that is error-tolerant and error-reducing, its metrology is very simple. In order to assemble a GIK structure, the assembler only has to press the parts together vertically. It is therefore a 2.5 axes assembler. The x- and y-precision is, at worst, the chamfer dimension ϵ. The chamfer size ϵ being typically about ½0 of the size of a vertical GIK brick, the printer needs a x-y precision of about 1 micrometer in order to assemble 20 micrometer big vertical GIK.

Active error correction. The digital assembler builds structures by adding in an entire line of digital material at once. However, it is possible that the resulting structure might have errors. There are at least 5 types of errors. The first 4 are digitally detected and the machine is able to correct them. When the machine is able to correct them, they are "digitally corrected". The fifth type of error is hard to correct and may require operator intervention. The errors are WRONG PART, FAULTY PART, POSITION LOOSENESS PROPAGATION, ILLEGAL LINE, and PART JAM. WRONG PART occurs when the assembler head inserts the wrong part, e.g. a blank instead of a GIK, or vice versa. FAULTY PART occurs when the part that the assembler is inserting cannot be inserted properly due to bad fabrication. POSITION LOOSENESS PROPAGATION occurs when, as layers are added, small errors (looseness) can propagate and it is necessary to press down the entire structure to fix it. ILLEGAL LINE occurs when a shifted or incomplete line is pressed into place. PART JAM occurs when a GIK part is jamming the machine mechanism. Due to the fact that each component is discrete, each of these errors will result in a misalignment in the structure. For WRONG PART, a blank instead of a GIK will appear as a gap and a GIK instead of an BLANK will appear as a bump. FAULTY PART will result in a bump. POSITION LOOSENESS PROPAGATION will be fixed by the fact that the assembler head knows how low it should go to insert the line, and will press down the structure enough to do so. ILLEGAL LINE will appear as many WRONG PARTS or FAULTY PARTS errors. If the digital material is reversible, the digital assembler is able to remove the parts detected as errors and replace them therefore providing error correction.

Figure 12:
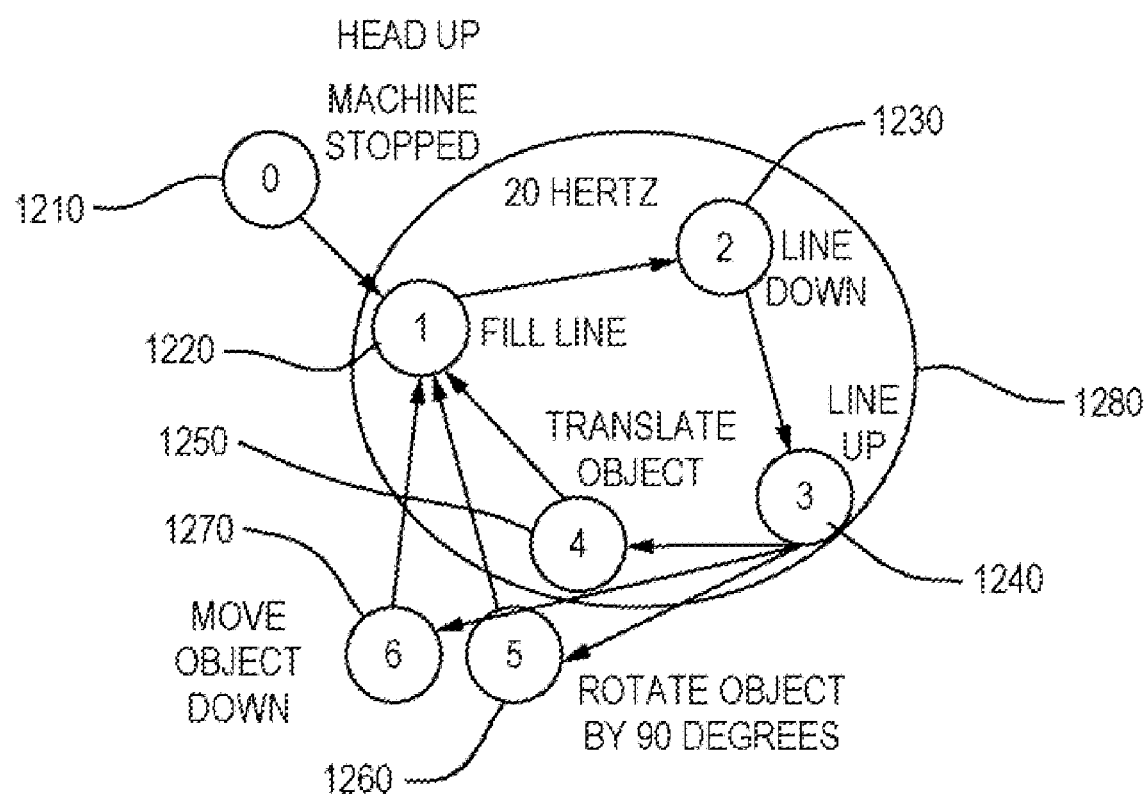
FIG. 12 is a state flow diagram for a generic digital assembler according to the present invention.

The assembler is effectively a synchronous state machine with a decision tree. The state flow diagram for a generic digital assembler according to the present invention is depicted in FIG. 12. In FIG. 12, at State 0 1210, the head is up and the machine is stopped. At State 1 1220, the line is filled. At State 2 1230, the line is pressed down. At state 3 1240, the line is completed and the head is up. At State 4 1250, the object is translated in preparation for the insertion of a new line. At State 5 1260, the object is rotated by 90 degrees in preparation for adding a new layer. At state 6 1270, the object is completed and moved down out of the assembler. States 1-4 are the states of active construction 1280.

The digital assembler of the present invention employs Programmable Digital Additive Assembly (PDAA). Programmable Digital Additive Assembly means that the assembler is creating an object by connecting together digital parts in a programmable fashion. The contrary of PDAA would be removing small bits of variable sizes from a piece of bulk material in order to end up with the same object. PDAA is inherently better because it is simpler, error preventive, inherently multi material, and reversible. The digital assembler of the present invention is able to build a large number of different structures. The structure to be assembled is coded in the sequence of parts it is using. Therefore if a structure is made out of one trillion GIK or BLANK parts, the assembler is able to build 2 to power one trillion (about 10 to power one trillion) different structures. Only some of these structures will demonstrate percolation between the GIK parts and will therefore be stable.

In order for the digital assembler to assemble structures of trillions of parts in a reasonable amount of time, it has to add about ten million parts per second. This is possible if and only if the digital assembler is demonstrating parallel assembly of parts line-by-line or plane-by-plane. The digital assembler is therefore intrinsically parallel. As long as the components composing the digital material can make a stable link at a given scale the digital assembler can assemble structures at that, scale by tuning up or down its actuators.

Figure 13B:
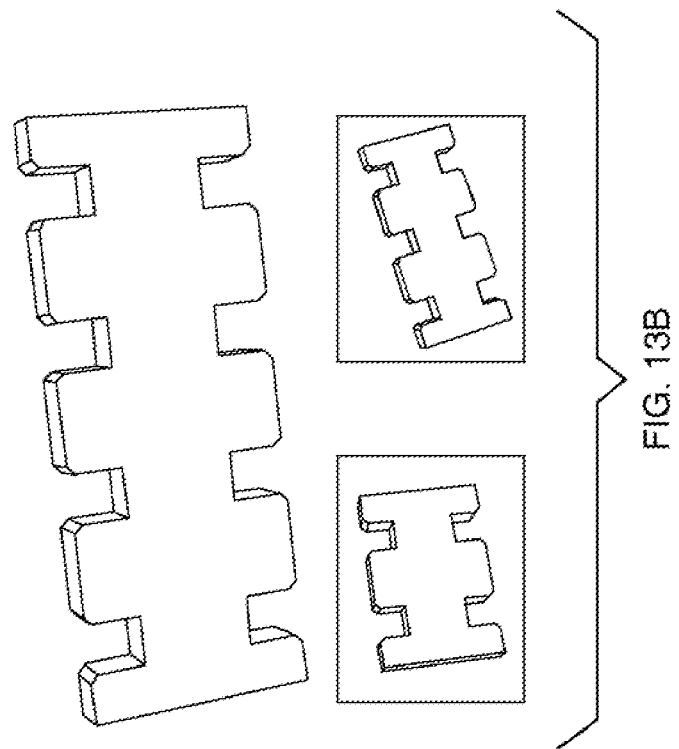
FIG. 13B depicts several exemplary rectangular normal GIK parts.
Figure 13A:
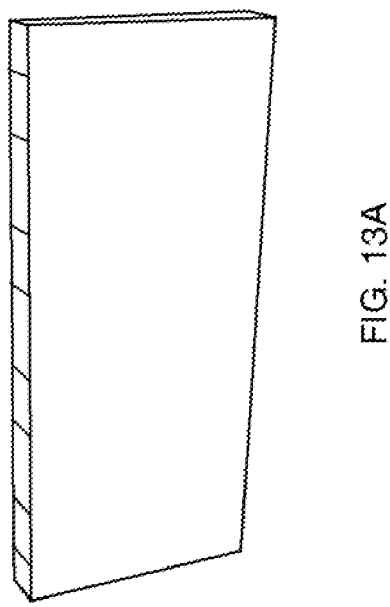
FIG. 13A depicts an exemplary rectangular GIK blank.
Figure 14:
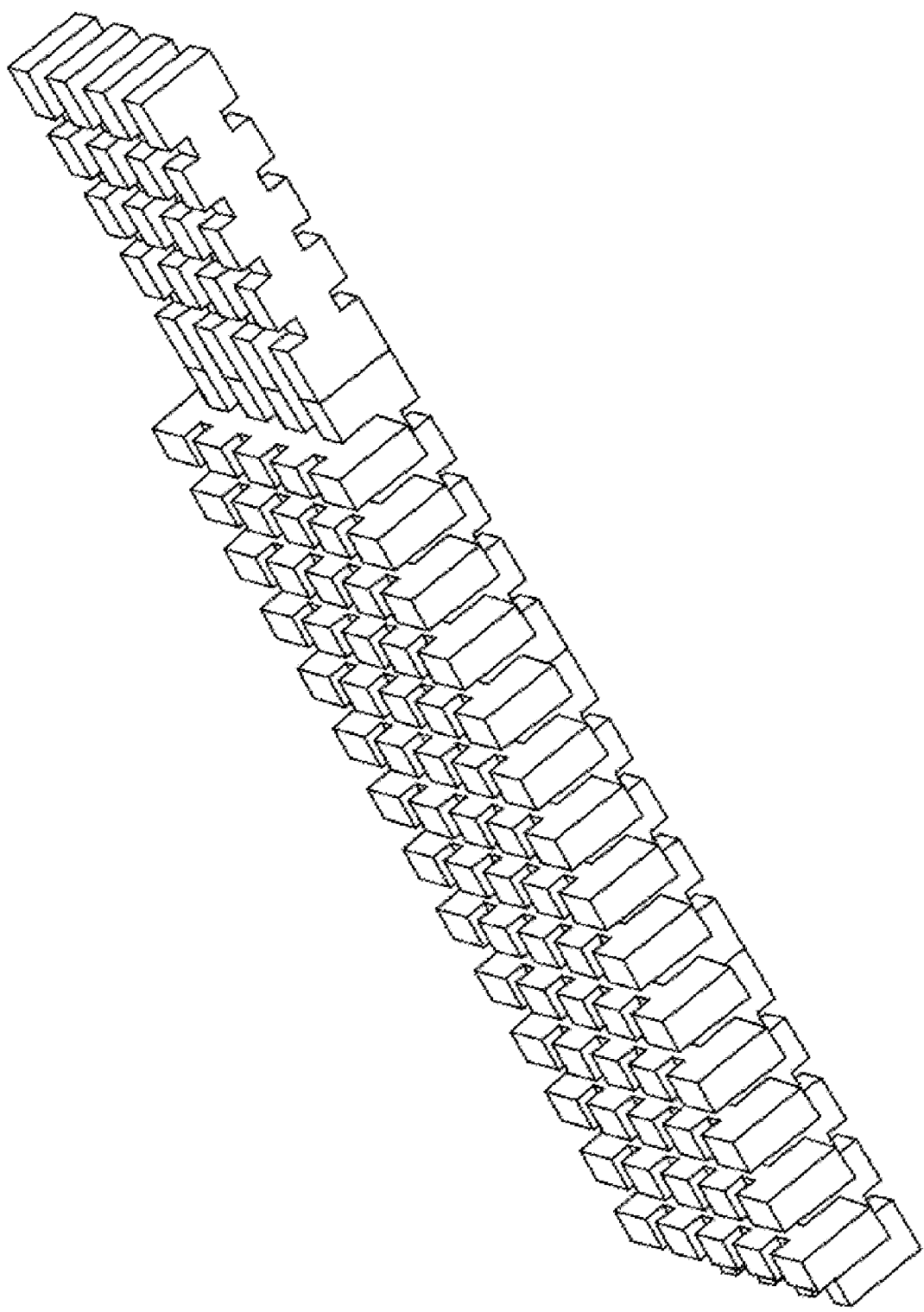
FIG. 14 depicts an exemplary multi-layer structure composed of vertical GIK parts.

GIK parts can take many different shapes, so long as the basic requirements previously set forth are met. For example, FIGS. 13A-B depict rectangular GIK parts. FIG. 13A depicts a rectangular GIK blank, while FIG. 13B depicts several rectangular normal GIK bricks with different topologies. As shown, the normal GIK bricks can have any number of slots. FIG. 14 depicts a multi-layer structure composed of vertical GIK parts. In FIG. 14, vertical GIK bricks form an incomplete 2-layer vertical GIK structure. Vertical GIK has the same properties as GIK and forms the same press links as GIK, but can only be assembled vertically. A vertical GIK structure is formed by rotating each layer in respect to the last one by 90 degrees in order to brace the two lines together.

Figure 15:
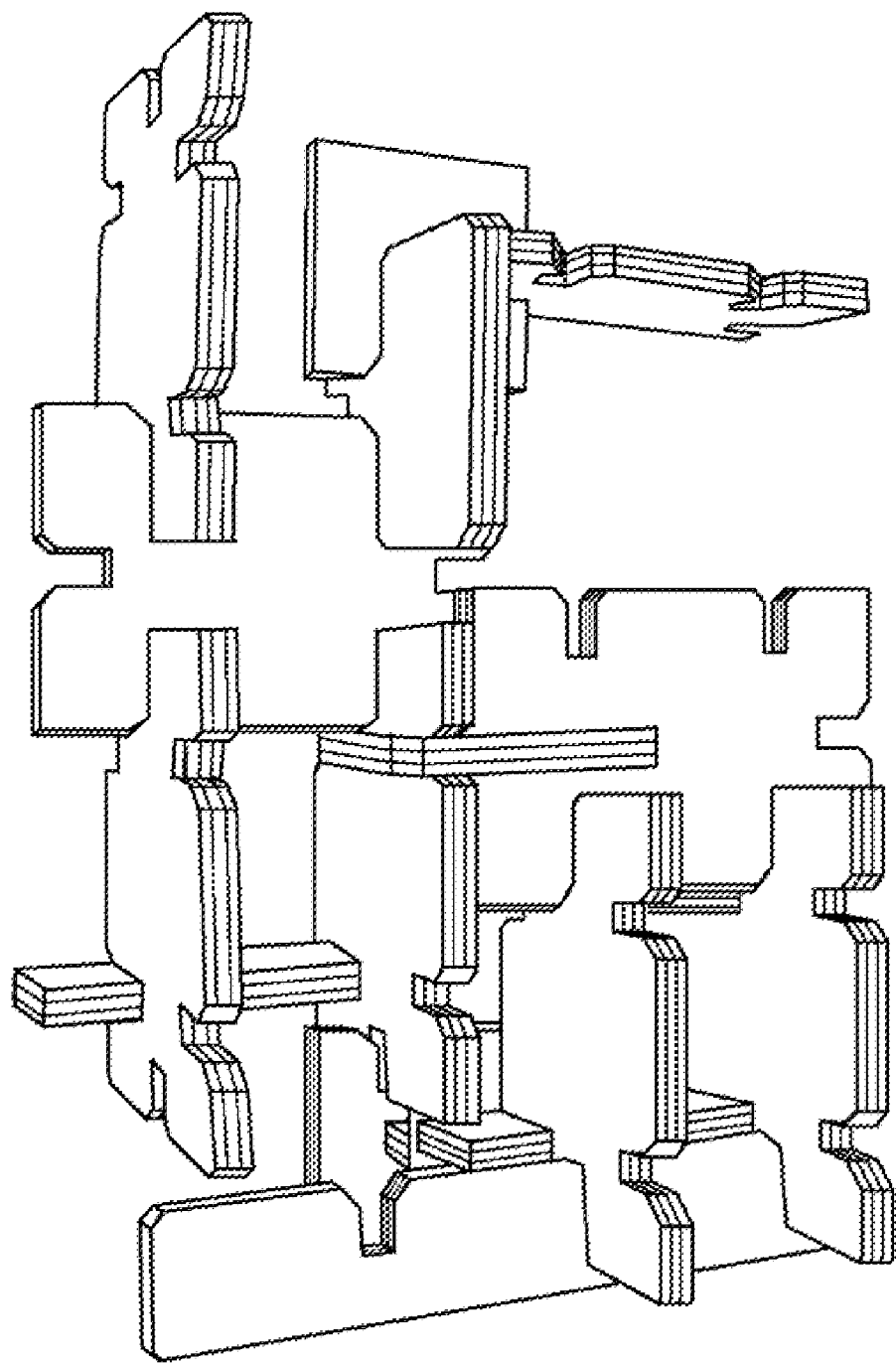
FIG. 15 depicts a simplistic example structure made from square GIK parts.
Figure 16:
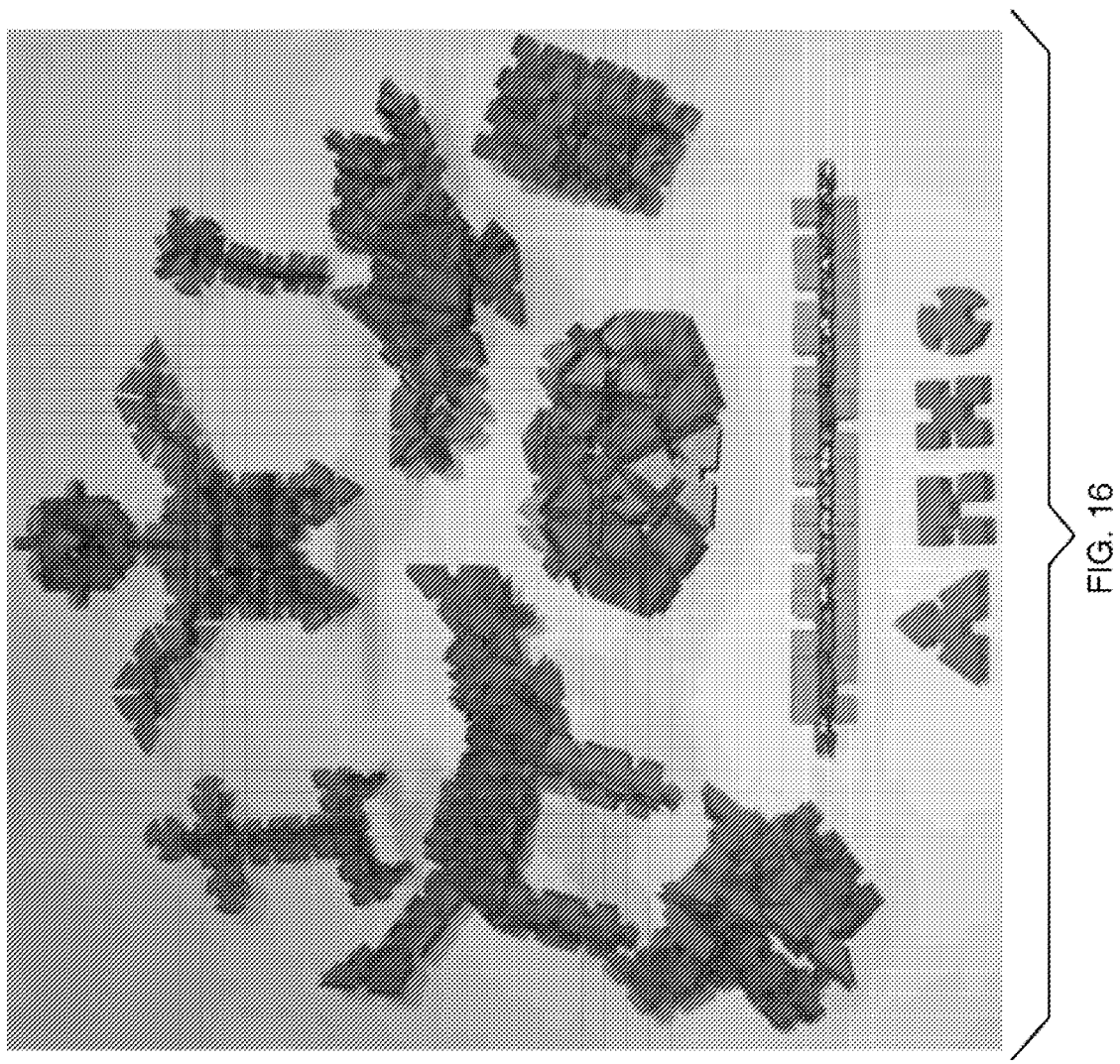
FIG. 16 is a photograph depicting several exemplary complex structures constructed from GIK parts of various shapes.

Stable GIK structures have heretofore been constructed out of different materials at different scales over four orders of magnitude apart. FIG. 15 depicts a simplistic example structure made from square GIK parts. FIG. 16 is a photograph depicting several exemplary complex structures constructed from GIK parts of various shapes. The behavior of press fit digital materials is explained by the material's elasticity and Coulomb's friction laws. Press fit digital materials can therefore be built at any length scale where these laws are valid, roughly from micrometer to meter scale.

In order to make a digital material, the parts must have the following properties: low tolerances on the component's dimensions, the distribution of the component dimensions to be symmetric around the average, high repeatability in the manufacturing process, and high manufacturing speed. A 10 cubic centimeter structure assembled out of 10 micrometer components will need 10 to power 12 components. The shapes of the GIK components that have so far been employed permit cutting the components out of a sheet of bulk material. $CO_2$ lasers, Excimer lasers, and Waterjet cutters have been successfully employed for this purpose, but it will be clear to one of skill in the art that many other methodologies may be advantageously employed for this purpose. For example, molding would be a good alternative.

The digital material does not rely on the chemical properties of the bulk material it is made out of in order to make bonds or links between the components. Therefore, a broad set of materials can be used to manufacture the elementary components. GIK bricks are not limited to those described herein, and can be made out of any of a variety of materials, including, but not limited to, metals, semiconductors, insulators, ceramics, magnetic, and piezoelectric optically active materials. Polymethylmethacrylate (other names: PMMA, acrylic, plexiglass), Delrin (other names: polyoxy methylene (POM), acetal resin, polytrioxane, and poly form aldehyde), PCB substrate (fiberglass mat impregnated with a flame resistant epoxy resin), Kapton (Polyimide), packing cardboard, white birch plywood, oak plywood, pine plywood, stainless steel, aluminum, paper, celluloid (projector transparencies), metal, and foam have been successfully used, and it is clear that any of the other may construction materials known in the art of the invention may be advantageously employed. Bricks of different materials can also be alternated in a given structure.

The digital material is made out of components that can make only a small finite number of connections. If these connections are reversible, then the entire structure can be disassembled and the parts recycled for another structure. Further, if the connections are reversible, then error correction can be performed by removing the faulty parts and/or parts of the structure can be disassembled as a post process in order to leave the structure with overhangs.

Construction Algorithms. There are a number of problems to be solved when constructing any particular object. One problem is whether there is always at least one sequence of parts which, when assembled, will build the structure that the user wants. The second problem is whether there is an algorithm that will give such a sequence.

Last, part problem. Not all digital materials can be assembled in the same way. For instance, it may be possible that a closed structure cannot be assembled by adding one piece at a time because the last piece has to make two connections in the same time. Other strategies are possible, however; for example, voxels can be built and then assembled in a line, the lines assembled in a plane, and then the planes assembled to make a 3D structure. Alternatively, it is possible to put together 2 parts, then to put two 2-part structures together, then two 4-part structures together, and so on, until the structure is finished.

Layer by layer construction. One of the possible, construction methods using GIK is to add one line at a time. It is easy to see that this method doesn't encounter the last part problem. However this method doesn't permit making free structures within free structures unless the blank, parts can be extracted from within the structure.

Cellular automata method. A possible way to find a construction algorithm for a given 3D structure is to use a version of Cellular Automata Assisted Manufacturing software (CAAM). CAAM employs a Cellular Automata algorithm and will be able to solve this computational problem.

Figure 17:
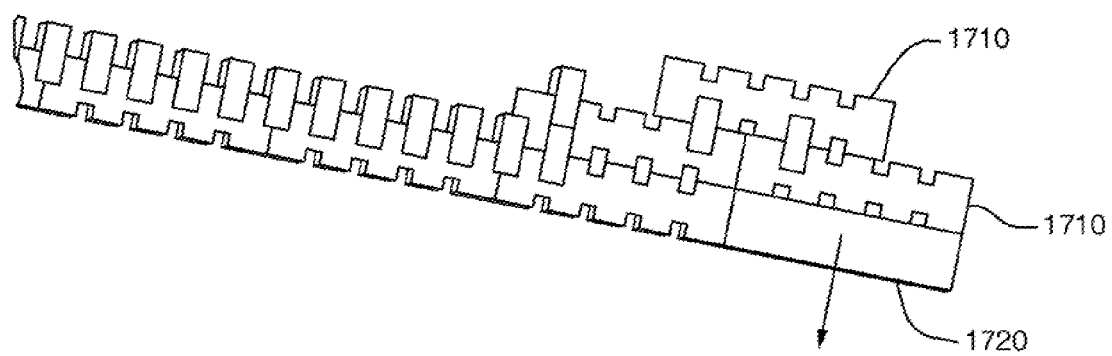
FIG. 17 depicts an example of the method for construction of an overhang, according to one aspect of the present invention.

Asymmetrical construction problem: creating overhangs. The Assembler is able to add a line of parts if and only if it has something to press it against. Indeed, the GIK parts (or any other digital material) must create a good connection in order to stay in place without falling. To this purpose, the support plate is preferably employed to support the first layer of construction. However, overhangs are needed to build certain structures. To create overhangs, the assembler can use BLANK parts in order to provide support for the next row of GIK parts. FIG. 17 depicts the construction of an overhang. In FIG. 17, vertical GIK 1710 and blank 1720 parts form an overhang structure. Blank and vertical GIK parts are the same size, but don't form any links. When the structure in FIG. 17 is lifted (removed from the machine), the blank parts fall or are shaken loose due to lack of connections and the final structure, left with an overhang, is retrieved.

Figure 18:
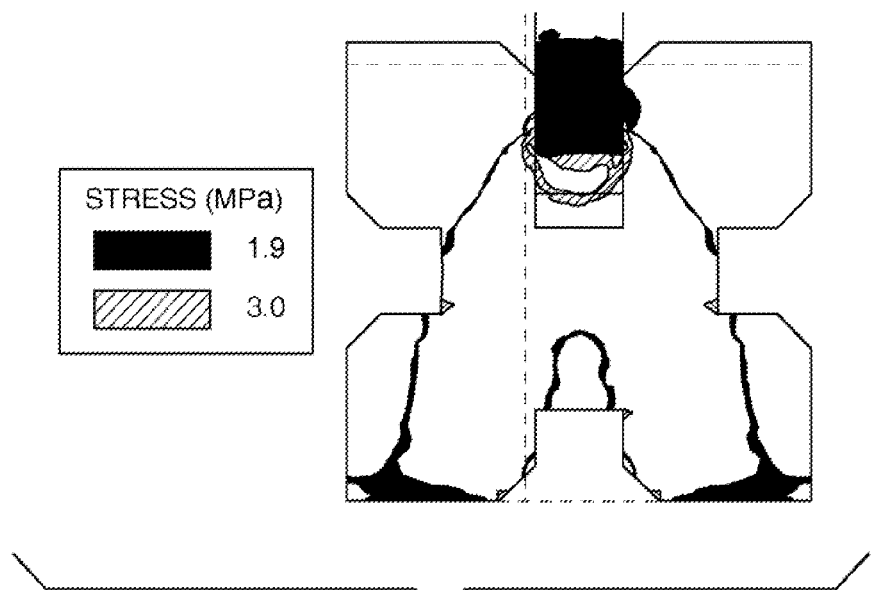
FIG. 18 depicts a simulated stress pattern in a square GIK.

A compression stress pattern analysis was conducted for a square GIK. Two transparent acrylic, 1 cm thick, GIK parts were made and compressed using the Instron material testing machine with a force of 500N. The acrylic parts were illuminated with white light through a polarizing lens. The resulting interior stress pattern was photographed using a Nikon 995 digital camera through an orthogonal polarizing lens. The resulting photograph was compared to the simulated stress pattern obtained using FEMLAB version 3.1 finite element, simulation software. The simulation results are shown in FIG. 18. The maximum amount of force a GIK piece can withstand in compression before rupture can be estimated as a function of the material it is composed of. The rupture points can also be predicted, and this was verified experimentally.

Figure 19:
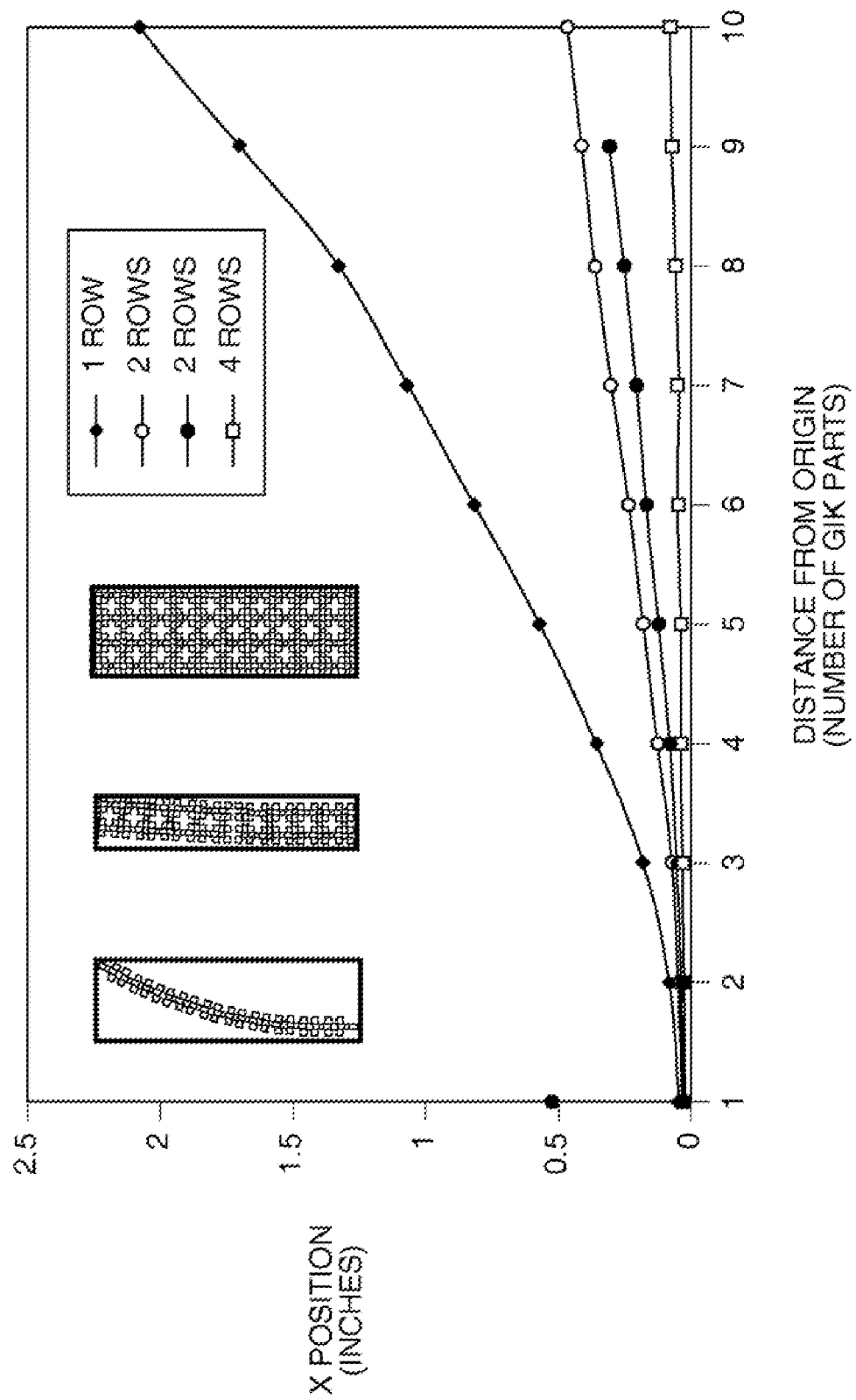
FIG. 19 is a graph of the amount of free movement as a function of the number of rows in a GIK structure.

A construction made out of digital material is built by adding components in the right places. Error prevention in a GIK structure is a function of the number of rows and number of parts. By building with a digital material, each closed loop in the structure is a check that each part is not too far away from its ideal position. The more parts that are added, the more checks that are needed, and the less the error may be. This is an intrinsic property of a structure built with a digital assembler. When a structure is built out of GIKs, each part added to the structure adds geometrical constraints to it and therefore limits the free movement of each piece. The amount of free movement as a function of the number of rows in a GIK structure was measured, with the results presented in the graph in FIG. 19. The experiment used laser cut Delrin (manufactured by E.I. DuPont de Nemours and Co.) GIK parts, cut on a commercial laser cutter. By adding more constraints along the x direction (1, 2 and 4 rows), one is forcing the x position of all the parts to be closer to 0. If $X_{k,n}$ is the x position of the nth piece in the structure made out of k rows, then $$|x_{4,10}|<|x_{2,10}|<|x_{1,10}|.$$

Defining $\epsilon_{k,n-m}=x_{k,n}-x_{k,m}$ then $\epsilon_{k,n-m}$ goes down with k, and doesn't really depend very much on n-m. This can be generalizes to y- and z-axes by symmetry. This property of digital materials can be referred to as error reduction. The x position of a piece in a GIK structure is constrained by the other GIK parts in the structure. Therefore, the larger the structure along the y-axis, the smaller the variation of the part's x-position.

In order for a digital material to be used in a digital assembler, the digital material and the bulk material have to have comparable compression properties. It has been demonstrated that the digital material, when assembled, demonstrates approximately the same properties in compression as the bulk material. All the material testing measurements were done on GIK parts cut on a laser cutter. The material used for materials testing was white birch plywood of thickness 95 mils+/−5 mils. The material testing machine was a commercial Instron 4411 (time resolution: 5 ms, force resolution: 0.01 N and position resolution: 0.01 mm). GIK part connection and disconnection hysteresis cycles where recorded using the Instron's GPIB interface and processed. To record such a cycle, two GIK parts were assembled by hand, then mounted in the Instron material-testing machine. The parts were pulled apart at a constant speed of 1 mm/min. and the pulling force was recorded. When the extension reached 2 mm (and the GIK parts were totally separated), the cycle was reversed until the parts were back to their original position.

Figure 20:
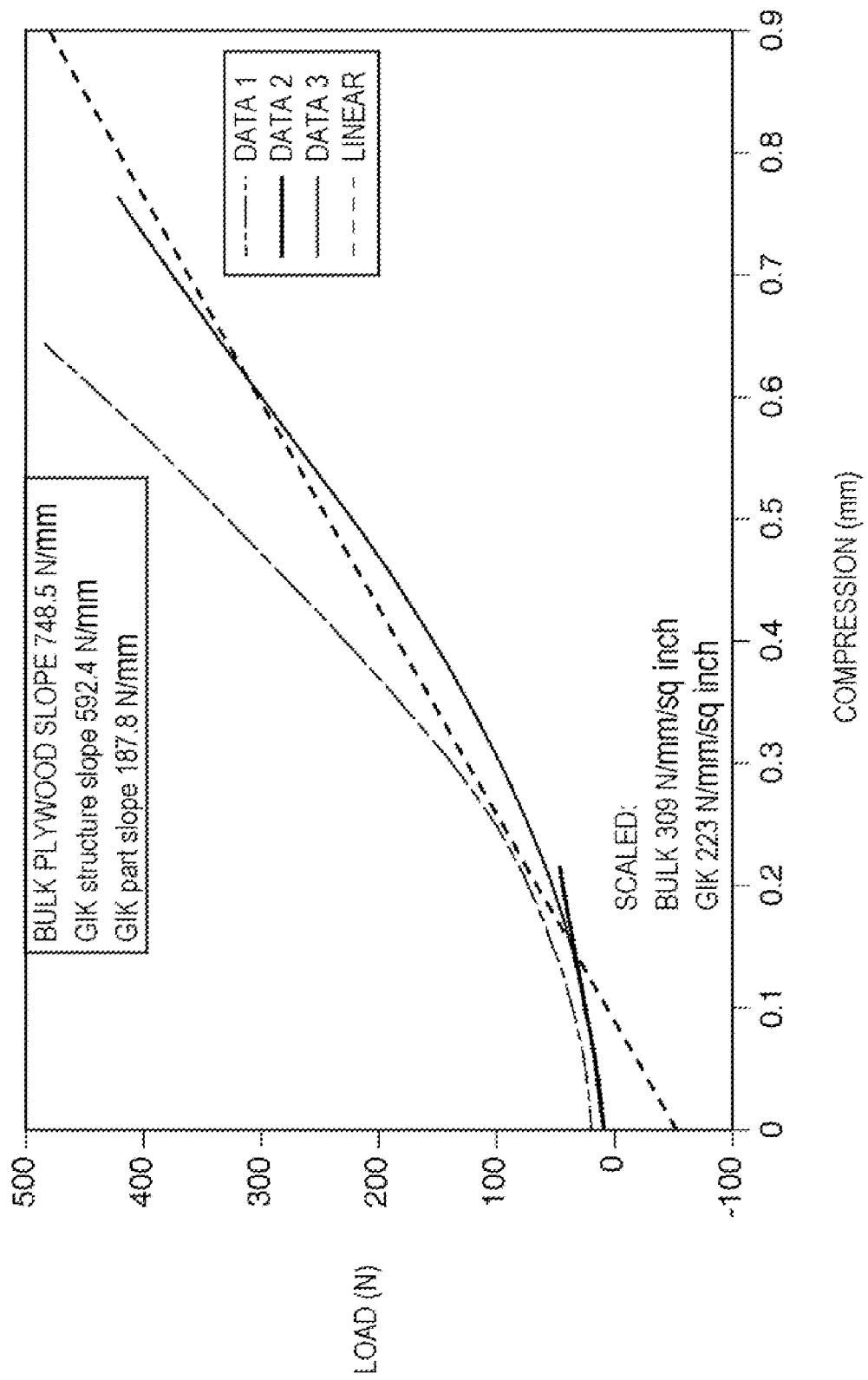
FIG. 20 is a load compression diagram comparing the compression modulus of bulk material versus the compression modulus of a GIK structure.

The behavior of an individual GIK building block was compared to a lattice structure that it was assembled into. A single GIK brick and a structure assembled from GIK were individually subjected to longitudinal compression. FIG. 20 presents a load compression diagram comparing the compression modulus of bulk material (plywood) versus the compression modulus of a 3-D GIK structure (1"×1.02"2.65") and a single GIK part (0.700"×3.45"×3.45"). As expected and seen in FIG. 20, the two specimens behaved almost identically and exhibit similar Young's moduli. The compression modulus is 309 N/mm/square inch for bulk plywood and 223 N/mm/square inch for the GIK structure.

Figure 21:
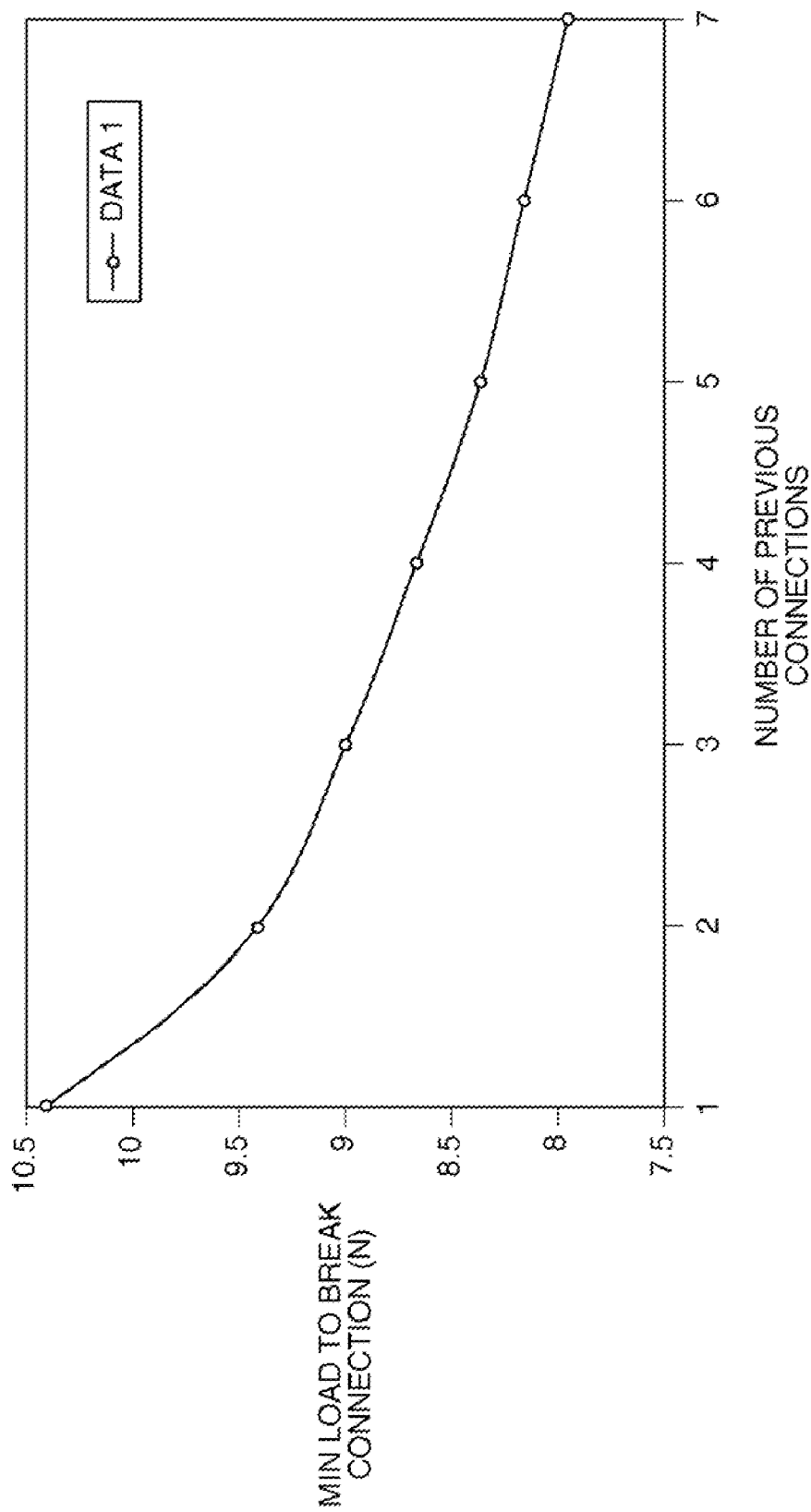
FIG. 21 is a graph plotting the necessary force to break the connection between two GIK parts as a function of the number of connections that the two parts have previously made.

The material life has to be of reasonable length. It is a concern that, by connecting and disconnecting components, the connections will become loose. It has been demonstrated that the minimum load to break; a connection, even if it decays with the number of connections, reaches a steady state which of reasonable value. The more that two parts have been connected together, the easier it is to disconnect them. It appears that the force necessary to break a connection does diminish, but doesn't disappear. However, as parts are connected and disconnected, it can be assumed that the links get weaker and weaker. The link, strength versus number of connections was measured experimentally. GIK parts were cut out of 0.1 inch+/−5 mils white birch plywood on a commercial laser cutter. The parts were connected by hand and installed in an Instron 4411 commercial material testing machine. The parts were connected and disconnected at constant speed of 1 mm per minute and the load necessary to maintain constant, speed was recorded. The maximum load recorded during the disconnection part of the cycle is an indication of the link strength. FIG. 21 is a graph plotting the necessary force to break the connection between two GIK parts as a function of the number of connections that the two parts have previously made. As shown in FIG. 20, the link; strength decreases with the number of previous connections.

The lower limit seems to be within 30% of the initial value, which is normally satisfactory.

Figure 22:
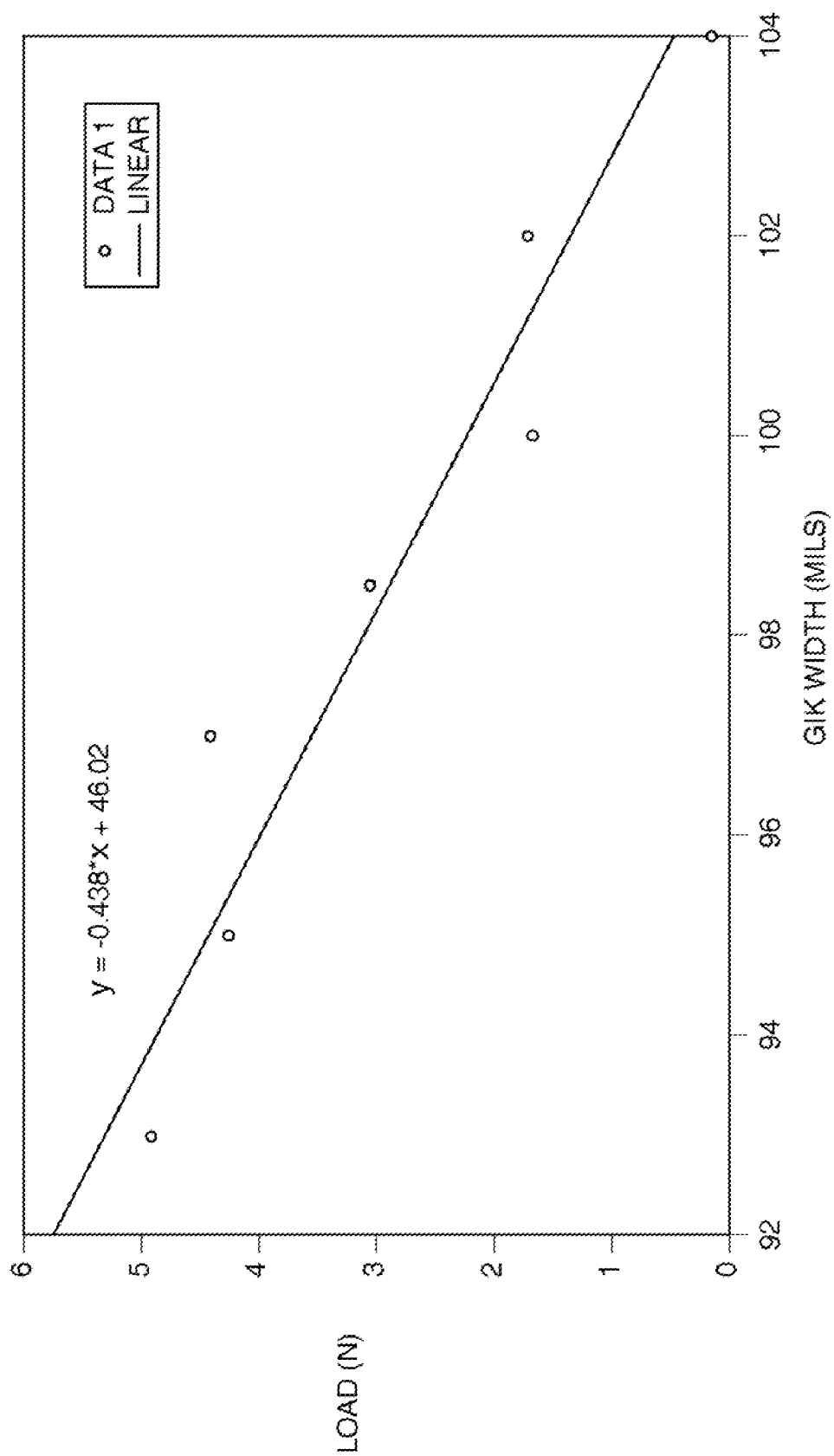
FIG. 22 is a plot of the maximum load that a connection between two GIK parts can sustain before breaking by pulling, as a function of the GIK width.

When subjected to a longitudinal tension test, it is possible to measure the force that is needed to break a press fit connection as a function of the slot size. It has been demonstrated that the force necessary to break a connection is high enough for the structure assembled with the digital assembler to hold. FIG. 22 is a plot of the maximum load a connection between two GIK parts can sustain before breaking by pulling as a function of the GIK width. The GIK parts used were square and made out of white birch plywood 95 mils thick. For the specific range of slot widths, there seems to be a linear relationship between the breaking force and the slot width. As seen in FIG. 22, the amount of force to break a GIK link varies linearly with the size of the slot. Provided that the digital material, GIK in this case, has the right dimensions, then the tension force necessary to break a connection between two parts can be high enough so that the structure built with the digital assembler will be stable. For all practical purposes, this information can be used for designing GIKs for a particular joint strength. This linear spring-type behavior signifies that GIKs press fit connection strength follows within some domain the equation $f=kx$. If x is the GIK slot width, then the contact surface S between two GIK bricks is $S=x^2$. If $k=YS$ where Y is the material's Young modulus, then the force needed to pull apart two GIK bricks within the spring domain is $f=Yx^3$.

Figure 23A:
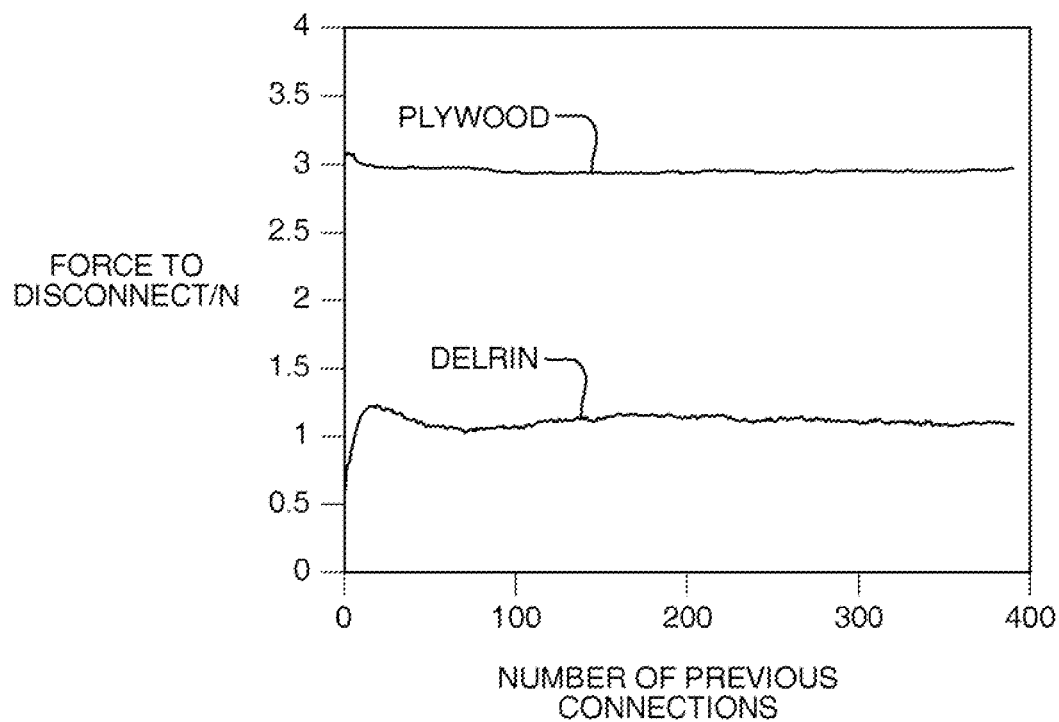
FIGS. 23A-B are graphs of force required for disconnection based on number of previous or simultaneous connections.
Figure 23B:
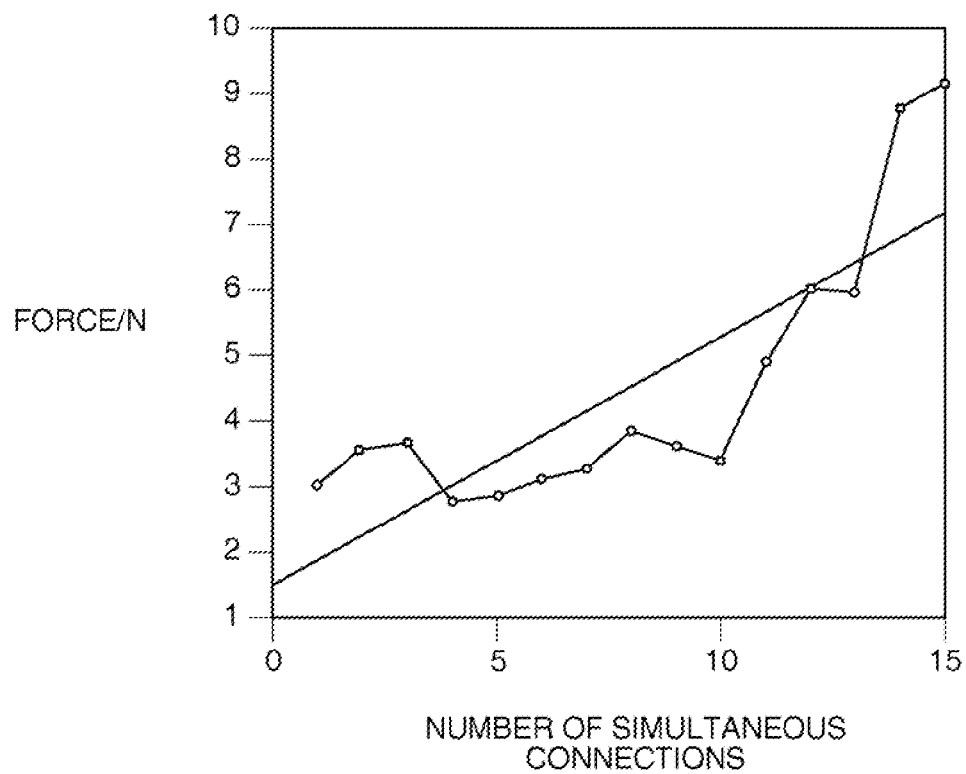

A post-assembly process may be performed in order to increase the force necessary to break a connection between two components. This can prevent the need for structure disassembly, correction, modification, and recycling. FIGS. 23A-B are graphs of force required for disconnection based on number of previous or simultaneous connections. A set of GIK parts with slot sizes between 92 mils and 104 mils was cut and the force necessary to separate-by-pulling two GIK pans was measured. FIG. 23A is a plot of the force needed to break apart a GIK connection over time as the same two Delrin and plywood GIK parts are connected and disconnected. As shown in FIG. 23A, the force needed to disconnect and connect the two GIK bricks varies only slightly with the number of previous connections, which implies that a GIK connection is truly reversible. As seen in FIG. 23B, and very much like DNA molecules, due to a stick-slip behavior, the amount of force needed to simultaneously disconnect (pull apart) a given number of GIK parts grows faster-than-linear. The press fit connection between GIK parts exhibits a stick/slip behavior and the passage from the stick state to the slip state is non-linear. The faster-than-linear increase in link strength with the number of parts would account for the high joint strength.

Besides error prevent/reduction, properties unique to digital materials include error detection, error tolerance, and material tuning. As seen in FIG. 2, an ideal square GIK tile can be decomposed into 21 identical cubes of size s. An ideal square GIK brick is of size 5s. Processing limitations inherent to a manufacturing technique will produce random errors in the size of the GIK brick. Let the size of a manufactured brick be defined by a random variable S. Such a manufacturing process is unbiased if and only if the random variable S describing the size of each object has a Gaussian distribution of expectation (i.e. average) $E(S)=5s$ and the size S of two different parts are uncorrelated. Let's call the variance of S, $Var(S)=s^2$. $s^2$ can also be seen as the manufacturing process precision. If a mono-dimensional GIK structure is built with n GIK square bricks, then the size of the resulting structure will be a random variable R. R is the sum of the size of each brick and is therefore has an expected value, $E(R)=5ns$ and of variance $Var(R)=ns^2$. $\sqrt{n}\sigma$ is then the standard deviation of R. Let's assume $\sqrt{n}\sigma$ is smaller than 5s. If $S_{Final}$, the measured size of the resulting structure, verifies $|S_{Final}-5\ ns|>2\sqrt{n}\sigma$, then there is 95% probability that there was at least one error in the structure. This parameter can be measured as the structure is being built and proceed to error correction as soon as an error arises. The deviation of the structure, $\sqrt{n}\sigma$, is proportional to the square root of n.

GIK structures are built using a pick and place mechanism. If the assembling mechanism is ideal and has an infinite accuracy it can drop the GIK parts in the designated positions. However actual mechanisms have a limited precision. A chamfer of angle a and width w will roughly allow for a misalignment of +/− w and +/− a degrees tilt. GIK parts are connected through layer-wise printing onto an XY grid. If the assembling mechanism is successful in accurately dropping the GIK parts in the designated positions on the 2D grid (XY), the basis of assembly error would be faulty GIKs or the deviation of the GIK from its designated 3D position. The second type of error can further be divided into two types: incomplete placement of the GIK along the Z-axis due to a severe interference fit and swiveling of the GIK at the joint due to a clearance fit. The swiveling of the GIKs can occur along an axis parallel to all 3 major axis. For now we shall ignore the swiveling of the GIKs along an axis parallel to the Z-axis. The opening of a chamfer defined by e would play the critical role in determining the threshold for error tolerance that can be built into the GIKs.

Figures 24A, 24B:
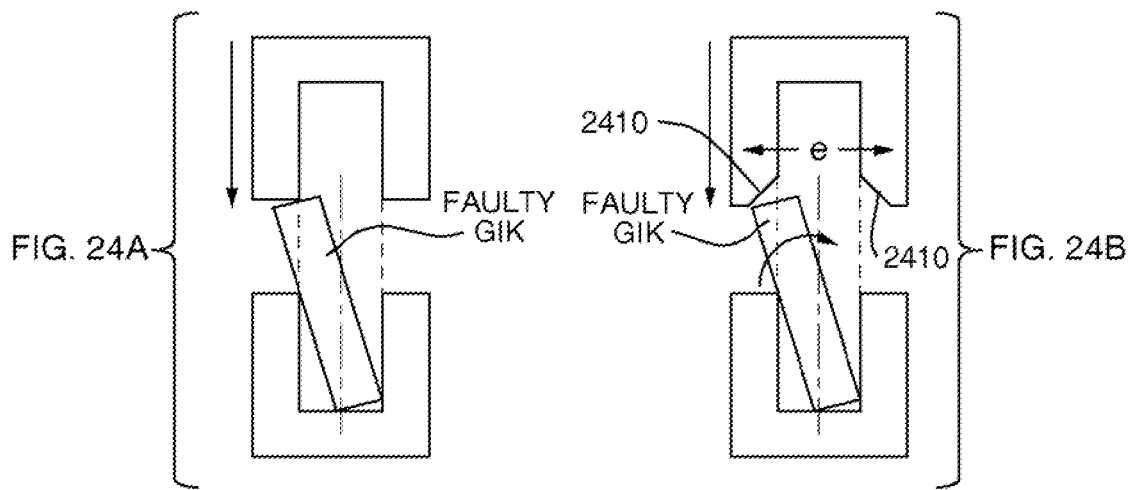
FIGS. 24A-B illustrate one method of GIK part error correction.

The GIK parts have chamfers on the side which allows for self orienting: if the angle between the line the assembler head is pressing down and the existing structure is not 90 degrees, the chamfers allow for adiabatic angle adjustment and therefore will provide error correction. FIGS. 24A-B illustrate a method of GIK part error correction. FIG. 24A illustrates a faulty GIK that has swiveled due to a clearance fit. The angle at which the GIK collapses can create an obstruction for the placement of the next GIK when there is no error correction allowance. FIG. 24B illustrates a GIK with an error correction allowance. The incorporation of a chamfer 2410 into the GIK aids in realigning the faulty GIK.

Figure 25:
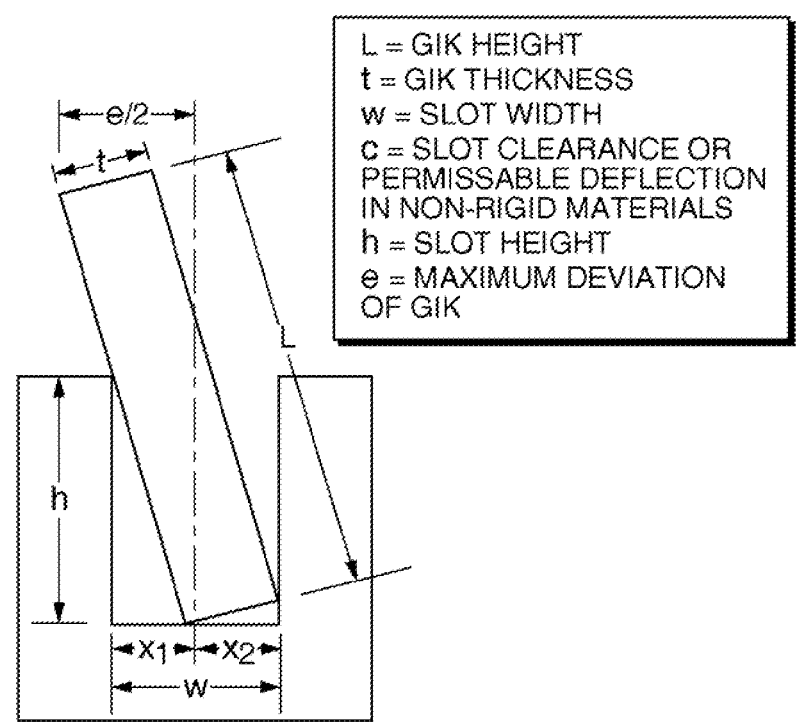
FIG. 25 depicts the maximum angle by which a GIK can swivel and its relationship with GIK geometry.

FIG. 25 depicts the maximum angle by which a GIK can swivel and its relationship with GIK geometry. If u, s respectively represent the mean and standard deviation of the slot width, then for the sake of convenience we can design the chamfer assuming $w=\mu+3s$ The value of $x_1$ can be determined by solving $$x_1^4 - 2wx_1^3 + (w^2+h^2)x_1^2 - 2wh^2x_1(w^2-l^2)=0$$

where:

$$0<x_1<w \text{ and } \theta=\tan^{-1}(x_1/h).$$

Thus the width of the chamfer opening would be $$\epsilon = 2\times(L\sin\theta + w/2 - x_1)$$

This property of digital material to tolerate the slot clearance can be referred to as error tolerance, e.

Unlike existing native materials, a digital material of choice may be built by manipulating one-by-one the conceptual "atoms" that the digital material is made out of. Useful design rules have been developed for GIK structures. Each brick in the GIK material is represented by 3 discrete coordinates x,y,z taking values in the set of integers. Arbitrarily setting one GIK brick to have the coordinates 1,0,0, the following rules suffice to describe a complete GIK structure: (1) each brick is connected to exactly 4 neighbors, and (2) a brick referenced by x,y,z coordinates can make only local connections to the bricks (x−1,y,z),(x+1,y,z),(x,y+1,z),(x,y−1,z),(x,y,z+1) or (x,y,z−1). To simplify notations say that a GIK piece connected to the x+1,y,z and x−1,y,z bricks makes x connections. Respectively, the same for y connections and z connections. Therefore, a brick makes either x,y connections, x,z connections or y,z connections and the parity of the x,y and z coordinates determine to which neighbor each brick is connected. A Matlab program was developed, using these rules, to design GIK structures in order to test some of their properties before building them.

Material mechanical tuning. Contrary to native materials, the properties of which are not tunable, digital material can be built to have whatever properties (mechanical, optical, electric, etc.) are desired. The properties of a GIK structure can be tuned by void, i.e. by leaving holes in the structure by not putting in bricks during the construction, by varying materials, i.e. by alternating the materials the GIK structure is made out of, and/or by geometry, i.e. by varying the type of crystalline geometry in the structure by using GIK bricks based on triangles, hexagons, or other shapes.

Figure 26:
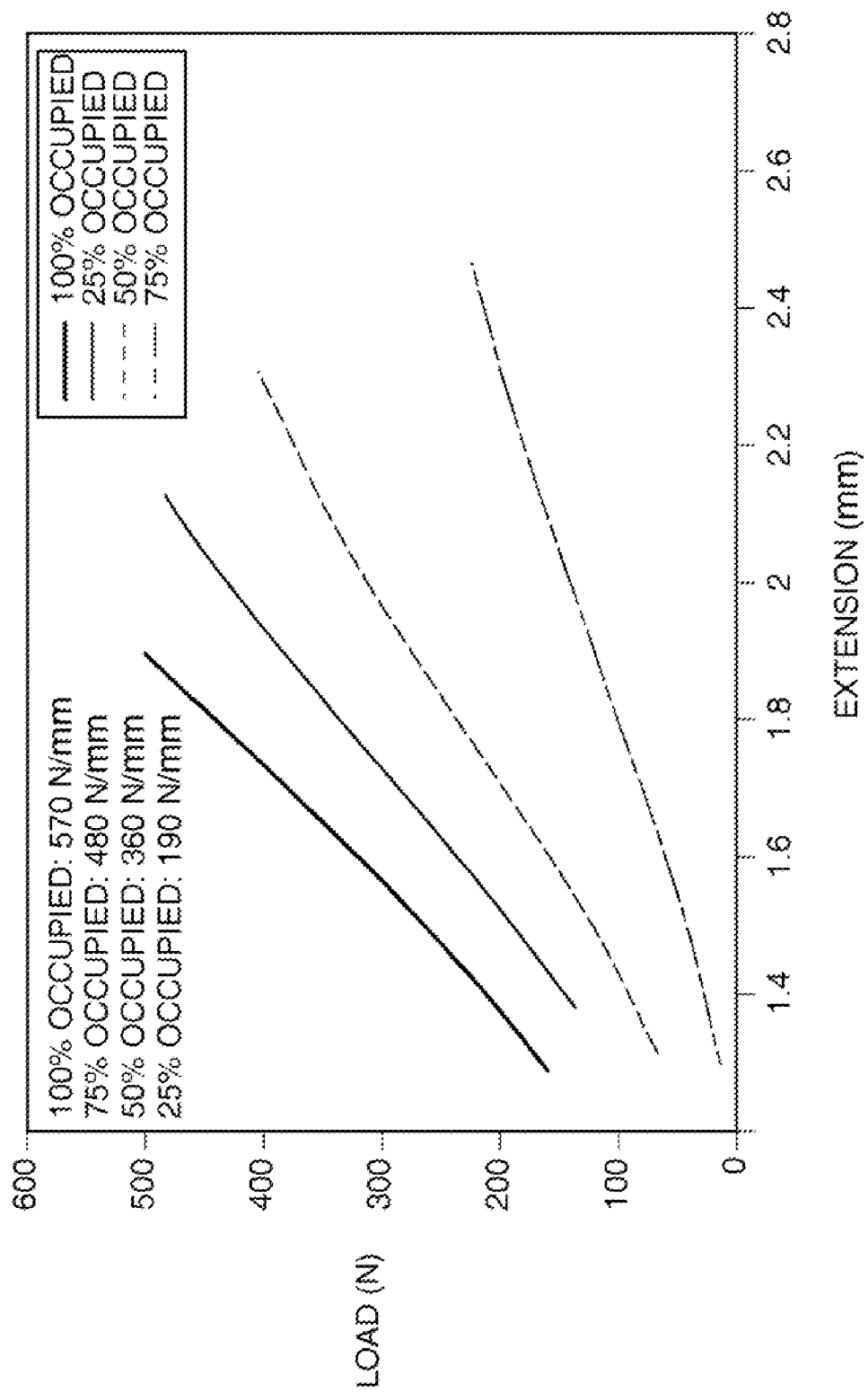
FIG. 26 is a graph depicting the variation of the compression modulus (the slope of load/extension graphs) of GIK structures for four different occupancy levels.

In particular, the percentage of sites occupied in a GIK structure can be varied in order to tune the mechanical behavior of the structure. A set of digital materials was fabricated in order to demonstrate compression modulus tuneability by void and by alternation of materials. Digital materials were built for which 0%, 25%, 50%, and 75% of the parts were removed. The voxel-based approach to building digital structures, permits building without achieving 100% density. This is done by selectively rejecting individual voxel sites during the building process. Multi-layered GIK structures were built out of Delrin, in which the occupancy of every other layer was varied. Structures were built with 25%, 50%, 75% and 100% of the sites occupied. The compression resistance in N/mm of the resultant structure was measured. FIG. 26 is a graph depicting the variation of the compression modulus (the slope of load/extension graphs) for four different occupancy levels.

As seen in the compression-force diagram in FIG. 26, the compression Young modulus increases when more parts are present. There is a linear relationship between the number of parts present in the structure and the compression modulus of the digital material. As seen in FIG. 26, a structure can be designed with an occupancy strategy to meet a precise target compression resistance. Similarly, digital materials like GIK can be engineered in order to obtain the desired mechanical behavior in compression, tension, and shear. Generalizing, GIK structures made of soft and hard materials during assembly can yield digital composites with unique properties. A second set of seven digital material structures was fabricated where the ratio of plywood parts to aluminum parts in the structure was varied from 100% to 0% in 16.6% steps. The resulting compression modulus again increases with the number of aluminum parts in the structure.

Isotropy by void. In order to understand how holes can be introduced in a GIK structure while still leaving a sturdy structure, a mathematical model to describe GIK structures was built and structures were simulated. The simulation showed that removing 1 brick out of 2 in the x direction, 1 out of 3 in the y direction and 1 out of 4 in the z direction will leave a stable structure. A structure of 8 by 8 by 8 GIK parts was built and a force-compression diagram was acquired for each x, y, and z direction using the Instron material testing machine. The compression modulus is different in each direction. The material's compression Young modulus is the highest in the z direction, lower in the y direction, and lowest in the x direction. (Further study would be necessary to correlate the number of voids in the structure to the value of the Young modulus). This obviously enables the engineering of digital materials to be anisotropic or isotropic, as desired.

Tension tuneability. As described previously and as seen in FIG. 22, the amount of force to break a GIK link varies linearly with the size of the slot. Also as described previously, the amount of force needed to disconnect a given number of GIK parts simultaneously grows faster-than-linear. The slot width and the number of links broken simultaneously can therefore be used to tune the amount of force needed to break apart a GIK structure in tension.

Orthogonal properties tuneability. Some material properties are nearly orthogonal. However attention must be paid to which tuneability method is used to independently vary two orthogonal properties. For example, tuning mechanical and electrical properties by using a void method for both will not decouple the properties. It is necessary to use two orthogonal methods to independently tune orthogonal properties.

Because the digital assembler employs digital material, the digital assembler has several advantages over other existing free form fabrication machines. The design of the structures the digital assembler is assembling is encoded in the components sequence and therefore the digital assembler doesn't need precise positioning. The use of digital material permits fast parallel assembly and error prevention. The digital assembler is able to assemble and disassemble structures made out of digital material. The construction is reversible and structures can therefore be recycled. The digital assembler is able to build 3-dimensional structures out of the digital material.

Due to the fact that the digital material can be made out of any of various materials (such as, but not limited to, artificial polymers, natural polymers, wood, glass, ceramics, metals, foams, semiconductors. Insulators, magnetic materials, piezoelectric optically active materials, etc.), the digital assembler can build multi-material structures. Due to the fact that the digital assembler can assemble digital materials made out of active materials (metal, semiconductors, insulators, optically transparent, optically opaque, etc.), the digital assembler can build active structures (for example, but not limited to, electric circuits). Further, the digital assembler can work at any scale from microns to hundreds of meters and digital assemblers can build microstructures as well as buildings, the digital assembler is able to build new digital materials by mixing, in the same structure, components of different materials, the digital assembler is able to tune the material properties of the new digital materials it is building by varying the density of components in the digital material it is assembling, and the digital assembler is able to tune the wave propagating properties of the new digital materials by building periodical 3-dimensional structures out of two (or more) materials with different wave propagation speeds (for example, but not limited to, photonic crystals).

One of the many possible applications for the digital assembler of the present, invention includes, but is not limited to, fast low-cost prototyping. The digital assembler allows designers or manufacturers to make 3-dimensional models fast and for a very low cost (the cost of the digital material). In comparison to existing fast low price prototyping machines, the digital assembler allows the usage of a vast set of materials, is of comparable speed, and is much cheaper due to its simplicity. The digital assembler of the present invention may also be used as a tabletop fabricator. Because of the low cost of the digital assembler and the digital materials, any household can afford a digital assembler. These digital assemblers can function as tabletop fabricators and enable people to build a large set of different objects. The tabletop fabricator will complement the existing manufacturing industry and can be used to manufacture small sets of objects for which the market is so small that no viable business could make it. Another application related to the tabletop fabricator and the fast prototyping machine would be to implement a digital assembler in parts of the globe where only a small set of materials is available locally. These materials are typically rough metals, wood, glass, etc. A digital assembler working with a digital material made out of those materials would enable those communities to manufacture a larger set of objects than is currently possible, for a lower cost. Digital assemblers can function at any scale, from the micrometer scale to the tens of meters scale. Therefore, a digital assembler using a digital material made out of large parts can easily manufacture furniture or houses. Using this technique will make house building faster, cheaper, and available to a larger number of people.

Electronic Circuits. One of the main applications, and a main advantage over existing free form fabrication machines, is that a digital assembler may be used to make active structures. Assembling multi-material GIKs to form active and passive electronics components is straight forward, by assembling a structure out of insulating and conductive materials. The reversibility of the digital assembler will permit, circuit modifications and therefore fast prototyping of electronic circuits. Given that the digital assembler is able to build a structure by adding together these components, it is straight forward that the digital assembler can build electronic circuits by putting together these components. Moreover, transparent and opaque components can also be built. Therefore, optically active structures may be constructed. Semiconductor GIK parts may be built and used to assemble rigorously electrically active (i.e. able to amplify electric signals) structures with the digital assembler. Assembling micron resolution GIKs of suitable material properties can be used to form photonic or sonic crystals.

Electrical tuneability. As an example, a Schottky diode can be formed from a metal GIK part and an Si GIK part. A Schottky diode was built by press fitting together three parts: Copper, N-doped Silicon and Lead. The Copper/N-Silicon press fit junction creates a Schottky diode (barrier height 0.35 eV). The Lead/Silicon junction creates an ohmic contact (barrier height −0.05 eV) that allows for easy measurement of the diode's characteristics. The tension in the current-tension characteristic diagram of the press-fit Schottky diode was measured using a digital oscilloscope Tektronix TDS 3052 (Input impedance 1 MOhm, 13 pF). The current in the current-tension characteristic diagram was measured by addying a 2 kOhm resistor in series with the diode and by measuring the voltage across the resistor using the same oscilloscope. The N-doped silicon GIK used for the Schottky diode presented in this paper was cut from a N/Phos dopes wafer of Resistivity 1-20 ohm-cm and thickness 525 micrometers+/−25 micrometers using a Bueheler diamond watering blade on a commercial ISOMET 1000 wafer cutting machine. The copper GIK used for the Schottky diode was also cut on the same machine in the same conditions from 0.047" thick stock copper. The lead GIK used for the Schottky diode was also cut on the same machine using 0.085" thick lead sheet purchased from McMaster-Carr.

Figure 27:
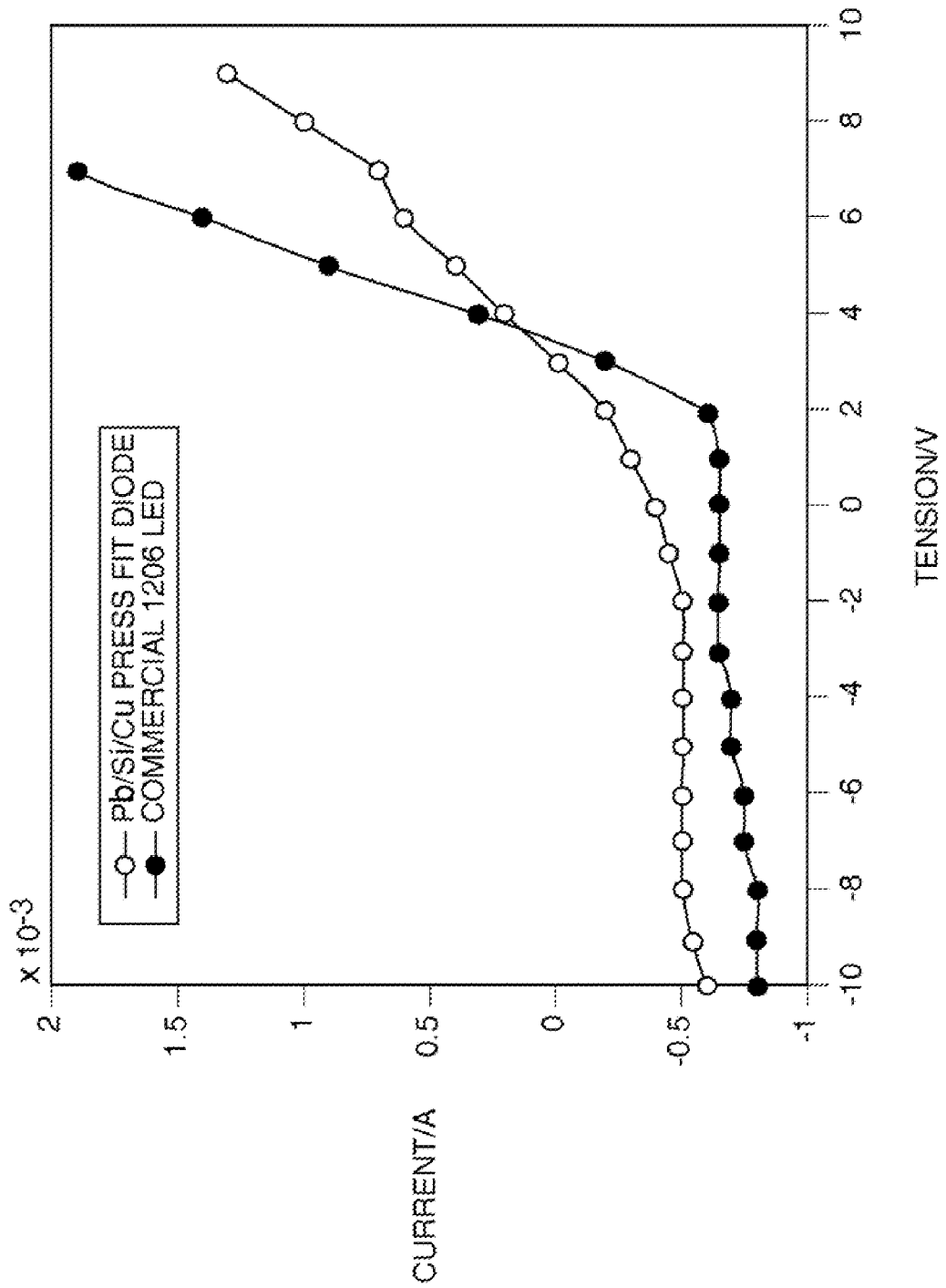
FIG. 27 is a graph presenting a comparison between the performance of a commercial LED diode and a diode constructed from digital materials, according to an aspect of the present invention.

As seen in FIG. 27, the instantaneous forward current when polarized with an instantaneous voltage of 4V is 0.4 mA for the press-fit diode and 0.6 mA for the commercial LED. A typical value for a commercial Schottky diode is 4 A at 0.5V. This difference is due to the low Cu—Si barrier height (0.35 eV) and to the press-fit diode's internal resistance of 100 kOhms on average, which is due to the rough-surface electrical contacts and the presence of native oxides in the contacts. Schottky diodes and resistors are sufficient to build a complete logic family. It has been demonstrated that electrically active structures may be built using only additive digital materials. In addition, by using alternate materials (such as, but not limited to, those with a different optical refractive index or different sound refractive index), it is straightforward to build sound and optical active materials, such as, but not limited to, photonic crystals and sonic crystals.

Another application of the digital assembler is assembling active structures, such as linear motors. This presents an advantage over existing commercial free form fabrication devices, which typically cannot print active structures like motors. By carefully choosing the right geometry for the structure, the digital assembler of the present invention can print linear motors. The digital assembler of the present invention can, for example, be used to build GIK actuators using electro-magnetic GIK parts and hinge mechanisms based on point-friction.

While a preferred embodiment is disclosed, many other implementations will occur to one of ordinary skill in the art and are all within the scope of the invention. Furthermore, each of the various embodiments described above may be combined with other described embodiments in order to provide multiple features. Furthermore, while the foregoing describes a number of separate embodiments of the apparatus and method of the present invention, what has been described herein is merely illustrative of the application of the principles of the present invention. Other arrangements, methods, modifications, and substitutions by one of ordinary skill in the art are therefore also considered to be within the scope of the present invention, which is not to be limited except by the claims that follow.

What is claimed is:

1. A digital assembler for creating a three-dimensional object, comprising:
   a synchronized digital system, the synchronized digital system having a set of subunits, each subunit being responsible for a different function, the subunits comprising:
      at least one assembly head for placing lines of digital material in a prespecified location in a line-by-line fashion, wherein a line of digital material comprises a plurality of digital material parts arranged linearly, the assembly head being specifically adapted such that all digital material in a line is placed into the object simultaneously;
      at least one error correction mechanism, the error correction mechanism working in cooperation with the assembler head to detect and repair errors in the digital material lines during assembly of the object, the error correction mechanism being specifically adapted to remove in its entirety any line found to have errors and to replace any removed line with an entirely new line;
      at least one parts feeder for supplying digital material parts to the assembly head; and
      at least one controller for directing the operation of at least one of the assembly head, error correction mechanism, or parts feeder.

2. The digital assembler of claim 1, wherein the error correction mechanism is part of the assembly head.

3. The digital assembler of claim 1, wherein the assembly head comprises a plurality of blades that move in a linear direction as a unit to assemble the object.

4. The digital assembler of claim 2, wherein the assembly head comprises a plurality of blades that move in a linear direction as a unit to assemble the object.

5. The digital assembler of claim 1, wherein the error correction mechanism comprises:
   at least one error detection blade; and
   at least one error removal blade.

6. The digital assembler of claim 3, wherein the assembly head comprises:
   at least one blade for placing lines of digital material in a prespecified location in a line-by-line fashion;
   at least one blade for error recognition;
   at least one blade for error removal; and
   at least one blade for filling in new digital material where previously removed due to errors.

7. The digital assembler of claim 1, further comprising a machine support frame.

8. The digital assembler of claim 1, wherein the assembly head comprises:
   at least one blade for adding digital material; and
   at least one blade for filling in new digital material where previously added digital material has been removed by the error correction mechanism.

9. The digital assembler of claim 1, comprising at least one parts feeder for supplying normal digital material parts and at least one parts feeder for supplying blank digital material parts.

10. A digital assembler head, comprising:
   a set of subunits, each subunit being responsible for a different function, the subunits comprising:
      at least one blade for adding digital material in lines, wherein a line of digital material comprises a plurality of digital material parts arranged linearly;
      at least one error correction blade, the error correction blade being specifically adapted to remove in its entirety any line of digital material found to have errors; and
      at least one material replacement blade for filling in new digital material where previously added digital material has been removed by the error correction blade, the material replacement blade being adapted to replace any removed line with an entirely new line.

11. The digital assembler head of claim 10, wherein the error correction blade comprises:
   at least one blade for error recognition; and
   at least one blade for error removal.

12. The digital assembler head of claim 10, wherein the blades operate simultaneously.

13. The digital assembler head of claim 11, wherein the error recognition blade comprises at least one sensor in communication with at least one touchpad.

14. The digital assembler head of claim 11, wherein the error removal blade can be operated alone in order to disassemble a previously-assembled object.

15. A method for assembling digital materials into a three-dimensional object, comprising the steps of:
   feeding a first line of digital material parts to an assembly head, wherein a line of digital material parts comprises a plurality of digital material parts arranged linearly;
   adding the first line from the assembly head to the object at a prespecified location; and
   performing, in parallel operations carried out by separate devices or separate parts of the same device, the steps of:
      pressing the first line onto the object;
      checking a second line already on the object for errors, the second line having been added to the object immediately before the first line;
      if errors were found in a third line on the object during a previous cycle, the third line having been added to the object immediately before the second line, removing the third line; and
      if a fourth line was removed from the object during a previous cycle, the fourth line having been added to the object immediately before the third line, replacing the fourth line.

16. The method of claim 15, wherein the simultaneous steps of pressing, checking, removing, and replacing are performed by the assembly head.

17. The method of claim 15, wherein the simultaneous steps of pressing, checking, removing, and replacing are performed by individual blades.

18. The method of claim 15, wherein the object is comprised of at least two layers, at least one of the layers being comprised of multiple lines, and further comprising the steps of:
   if more lines are to be added to the present layer, feeding a new line to the assembly head; and
   if no more lines are to be added to the present layer, and if there is an additional layer to be added, rotating the object or assembly head before adding the first line of the additional layer.

19. The method of claim 15, further comprising the step of creating at least one overhang by employing a mixture of normal digital material parts and blank digital material parts in a prespecified manner.

20. The method of claim 15, further comprising the step of creating at least one void by employing a mixture of normal digital material parts and blank digital material parts in a prespecified manner.

* * * * *